US006936085B2

(12) United States Patent
DeMarco

(10) Patent No.: US 6,936,085 B2
(45) Date of Patent: Aug. 30, 2005

(54) VACUUM LOADER

(75) Inventor: Thomas M. DeMarco, Woodstock, IL (US)

(73) Assignee: DeMarco Maxvac Corporation, McHenry, IL (US)

( * ) Notice: Subject to any disclaimer, the term of this patent is extended or adjusted under 35 U.S.C. 154(b) by 6 days.

(21) Appl. No.: 10/389,792

(22) Filed: Mar. 17, 2003

(65) Prior Publication Data

US 2003/0131571 A1 Jul. 17, 2003

Related U.S. Application Data

(63) Continuation-in-part of application No. 09/569,831, filed on May 10, 2000, now Pat. No. 6,569,217.

(51) Int. Cl.[7] ........................ B01D 50/00; B01D 45/00; B01D 46/00
(52) U.S. Cl. ........................ 55/324; 55/320; 55/337; 55/341.5; 55/345; 55/350.1; 55/434; 55/440; 55/443; 55/447; 55/452; 55/453; 55/455; 55/456; 55/459.1; 55/460; 55/462; 55/467; 55/DIG. 3; 96/380; 96/382; 96/384
(58) Field of Search ................ 55/282, 293, 302, 55/320, 321, 324, 334, 337, 341.5, 342, 345, 350.1, 361, 398, 428, 430, 434, 440, 443, 447, 452, 453, 455, 456, 459.1, 460, 462, 467, 466, 467, DIG. 3; 96/380, 381, 382, 384, 385, 387, 388; 95/268, 269, 271, 280; 210/512.1

(56) References Cited

U.S. PATENT DOCUMENTS

| | | | | | |
|---|---|---|---|---|---|
| 1,797,812 | A | * | 3/1931 | Waring | 55/459.1 |
| 3,031,825 | A | * | 5/1962 | Fourniere | 55/452 |
| 4,572,726 | A | * | 2/1986 | Van Abbema | 55/337 |
| 4,846,860 | A | * | 7/1989 | Yu | 55/337 |
| 4,900,345 | A | * | 2/1990 | le Jeune | 55/337 |
| 5,064,454 | A | * | 11/1991 | Pittman | 55/302 |
| 5,180,407 | A | * | 1/1993 | DeMarco | 55/459.1 |
| 5,800,578 | A | * | 9/1998 | Johnson | 55/302 |
| 6,569,217 | B1 | * | 5/2003 | DeMarco | 55/324 |
| 6,623,539 | B2 | * | 9/2003 | Lee et al. | 55/459.1 |
| 2001/0054213 | A1 | * | 12/2001 | Oh et al. | 55/447 |

* cited by examiner

Primary Examiner—Duane Smith
Assistant Examiner—Jason M. Greene
(74) Attorney, Agent, or Firm—Welsh & Katz, Ltd.; Thomas W. Tolpin

(57) ABSTRACT

A specially arranged vacuum loader and industrial dust collector with a perforated plate tangential cyclone separator is provided to efficiently remove, readily collect, effectively separate and safely dispose of wet, dry and fibrous materials, including liquids and slurries. The special vacuum loader and industrial dust collector has a solids-gas separation compartment comprising a tangential cyclone separator, preferably a perforated plate tangential separator, which is positioned generally alongside and laterally offset from one or more filtering compartments to minimize turbulence and re-entrainment of the collected particulate material.

12 Claims, 6 Drawing Sheets

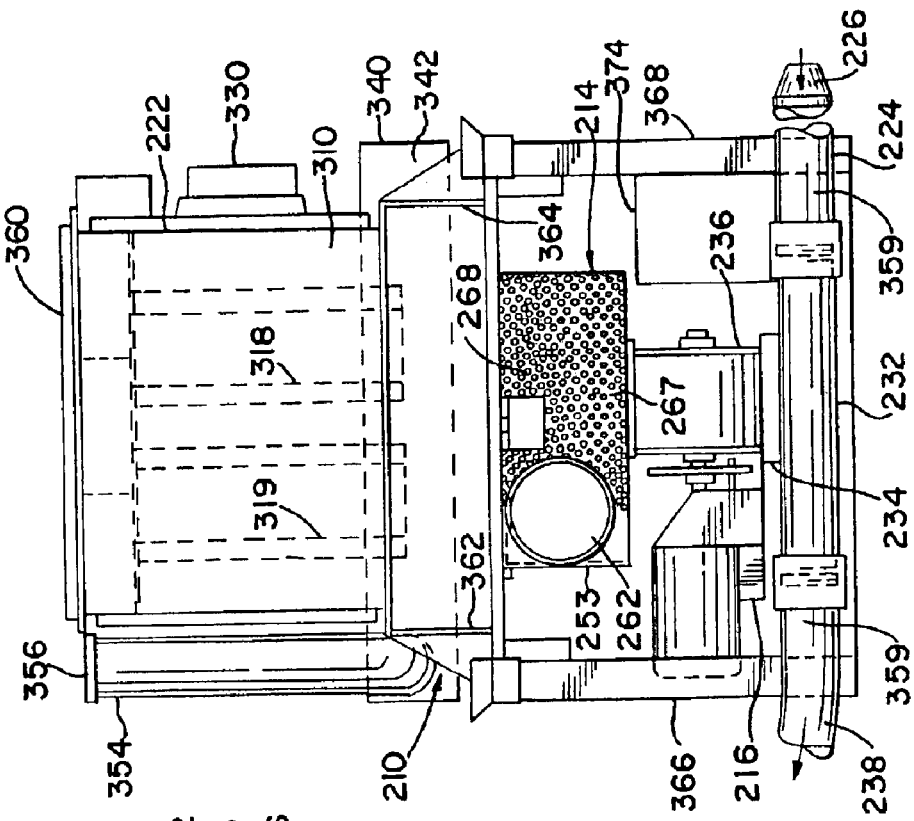
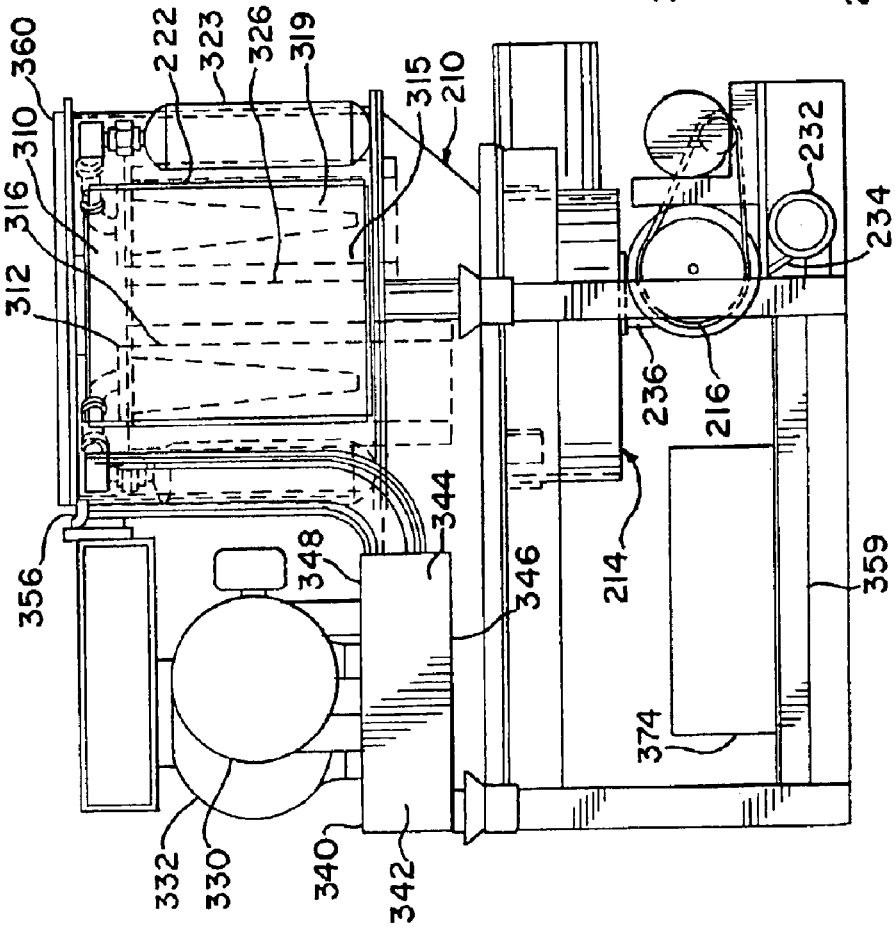

VACUUM LOADER

CROSS REFERENCE TO RELATED APPLICATIONS

This application is a continuation-in-part of application Ser. No. 09/569,831 filed May 10, 2000 issued as U.S. Pat. No. 6,569,217B1 on May 27, 2003 entitled "Industrial Dust Collector With Multiple Filter Compartments" in Group Art Unit 1724 before Examiner Jason M. Greene.

BACKGROUND OF THE INVENTION

This invention pertains to machines for removing dry and wet liquid particulates, and more particularly, to an industrial vacuum cleaner loader or industrial dust collector.

In industry, voluminous amounts of particulate matter, debris, and waste are emitted during machining, foundry, milling, shipment, warehousing, assembling, fabricating, and other manufacturing operations. Particulates of dust emitted during a manufacturing operation can include metal slivers, plastic chips, wood shavings, dirt, sand, and other debris. Dust accumulates on floors, machines, packaging materials, equipment, food and personnel. Dust is carried and circulated in the air and can be injurious to the health and safety of operating personnel and other on site employees. Dust can damage, erode, and adversely effect the efficiency and operability of equipment. It can also create a fire hazard and cause explosions in some situations, such as in grain elevators. Voluminous amounts of dust can pollute the atmosphere. Dust may also impair the quality of the products manufactured.

Dust emissions are not only dangerous and troublesome, but are particularly aggravating and grievous where relatively dust-free conditions and sterile environments are required, such as in medical supply houses, the electronics industry, and in food-processing plants.

Over the years a variety of vacuum loaders, industrial dust collectors and other equipment have been suggested for removing industrial dust and debris and for other purposes. These prior art vacuum loaders, dust collectors and equipment have met with varying degrees of success.

It is, therefore, desirable to provide an improved vacuum loader or industrial dust collector which overcomes most, if not all, of the preceding problems.

BRIEF SUMMARY OF THE INVENTION

In another preferred embodiment, an improved vacuum loader or industrial dust collector with multiple filter compartments or with multiple filters positioned about one or more solids-gas separators, is provided to remove airborne as well as settled particulate matter, debris and waste from industrial plants and other locations. Advantageously, the novel vacuum loader or industrial dust collector with multiple filter compartments is efficient, effective, and safe. Desirably, the user-friendly vacuum loader or industrial dust collector with multiple filter compartments can also be movable, portable, or towable, and can be used in a stationary manner. The special vacuum loader or industrial dust collector with multiple filter compartments can accommodate standard and different size bins and hoppers. Furthermore, the multiple use industrial dust collector with multiple filter compartments provides a superb industrial vacuum cleaner, vacuum loader, and conveyor.

The vacuum loader or industrial dust collector with multiple filter compartments has a solids-gas separating (separation) compartment which contains a solid-gas separator to effectively remove large particulates of dust from a dusty gas stream. In the preferred form, the solids-gas separator can comprise a perforated tangential cyclone separator. The solids-gas separator can also comprise a barrier wall portion comprising an impact plate separator (strike plate). Desirably, the tangential cyclone separator and the impact plate separator comprise a deflector(s) which changes the direction of flow of the incoming dusty gas stream. At least one inlet conduit is connected to the solids-gas separating compartment to feed the influent dusty gas stream to the solids-gas separating compartment.

The vacuum loader or industrial dust collector can have two or more filter compartments which are positioned about one or more solids-gas separating compartments. In some circumstances, it may be desirable to have an array, series or plurality of filters positioned concentrically, eccentrically or about one or more solids-gas separating compartments and in such circumstances, the filter can be arranged in a single annular filter compartment or in an array, series, or set of filter compartments.

In one preferred form, a first filter (filtering) compartment can be positioned generally along side and spaced laterally away from the solids-gas separating compartment and in offset relationship thereto, rather than vertical alignment or completely above the solids-gas separation compartment. The first filtering compartment has at least one first filter to filter a first portion of the dusty gas stream. At least one first compressed air tank communicates with the first filtering compartment. Also, at least one first air injector is operatively connected to the first compressed air tank to inject compressed air with sufficient kinetic energy into the first filter in the first filtering compartment to help clean the first filter. A first intermediate conduit can be provided to pass a portion of the dusty gas stream exiting the solids-gas separating compartment to the first filtering compartment. A first discharge conduit can be connected to the first filtering compartment to discharge the filtered first portion of the dusty gas stream from the first filtering compartment.

This novel invention greatly improves the separation of material from an air stream in a material collection chamber via a primary tangential cyclone separator. The material and air are pulled by vacuum or pushed by pressure to a tangential cyclone separator for separation of the material from the air stream so that the material can drop into the container and the separated air can flow to the air outlet port.

This separation can be more thorough by adding perforations in the cyclone wall plate. The plate perforations results in kinetic shear separation of the particulates (material) from the air stream with the majority of the material (remaining) on the inside of the cyclone and the air kinetically separating by flowing through the cyclone plate perforations. This also vents or prevents the separator and in the material collection chamber (bin) below.

The tangential separator can have directional vanes extending between the inlet and outlets to change the direction and direct the flow of the dusty fluid and enhance separation of the particulates. The vanes can help minimize and prevent clogging, backup and piling up of particulates of dust in the tangential separator. In an illustrated form, the tangential separator comprises a tangential entry cyclone separator with an annular wall positioned about the outlets and directional vanes. The inlet comprises a tangential intake conduit which extends tangentially from the annular wall. The directional vanes can comprise imperforate and rigid barriers, although in some circumstances it may be desirable that they be flexible, perforated or foraminous.

One or more of the barriers can be spaced away from the inlet. Some of the barriers can be spaced apart from the outlets. The directional vanes can include at least one curved vane and some of the vanes can have a beveled end. The directional vanes can further include a baffle, such as a set of arcuate baffles, which connect the inlet and outlets. The directional vanes can also include deflectors with concave and/or convex surfaces. Some of the deflectors can be connected and extend to the outlets.

The vacuum loader can also comprise: an inlet hose to draw and vacuum fluid laden with particulate under a negative suction pressure; a first stage bulk material receiver-separator, a second stage tangential separator to receive the particulate laden fluid carryover from the first stage bulk material receiver; a reinjection unit with a collection chamber communicating with the inlet hose to receive separated particulate material from the second stage tangential separator; and third stage single or multiple filtering units. The first stage bulk material receiver-separator assembly can comprise: a rotary bulk separator direct belt loader to receive and make a gross cut separation of the particulate material from the fluid, and has bulk material receiver comprising a bin, receiver, or conveyor(s), such as a belt conveyor, to receive, convey or transport the grossly separated particulate material away from the rotary bulk material receiver separator. The second stage separator assembly can include the tangential separator. The third stage filtering units filter the partially dedusted fluid from the second stage tangential separator. The vacuum loader can be mounted on a forklift skid or a trailer and can be equipped with a vacuum pump and silencer.

The vacuum loader can have a vacuum power package with a positive displacement vacuum pump driven by an engine or motor. The vacuum pump can pull vacuums, e.g. up to 16 inches mercury (217 inches water).

In another preferred embodiment, an improved vacuum loader or industrial dust collector with multiple filter compartments or with multiple filters positioned about one or more solids-gas separators, is provided to remove airborne as well as settled particulate matter, debris and waste from industrial plants and other locations. Advantageously, the novel vacuum loader or industrial dust collector with multiple filter compartments is efficient, effective, and safe. Desirably, the user-friendly vacuum loader or industrial dust collector with multiple filter compartments can also be movable, portable, or towable, and can be used in a stationary manner. The special vacuum loader or industrial dust collector with multiple filter compartments can accommodate standard and different size bins and hoppers. Furthermore, the multiple use industrial dust collector with multiple filter compartments provides a superb industrial vacuum cleaner, vacuum loader, and conveyor.

The vacuum loader or industrial dust collector with multiple filter compartments has a solids-gas separating (separation) compartment which contains a solid-gas separator to effectively remove large particulates of dust from a dusty gas stream. In the preferred form, the solids-gas separator can comprise a tangential cyclone separator. The solids-gas separator can also comprise a barrier wall portion comprising an impact plate separator (strike plate). Desirably, the tangential cyclone separator and the impact plate separator comprise a deflector(s) which changes the direction of flow of the incoming dusty gas stream. At least one inlet conduit is connected to the solids-gas separating compartment to feed the influent dusty gas stream to the solids-gas separating compartment.

The vacuum loader or industrial dust collector can have two or more filter compartments which are positioned about one or more solids-gas separating compartments. In some circumstances, it may be desirable to have an array, series or plurality of filters positioned concentrically, eccentrically or about one or more solids-gas separating compartments and in such circumstances, the filter can be arranged in a single annular filter compartment or in an array, series, or set of filter compartments.

In one preferred form, a first filter (filtering) compartment can be positioned generally along side and spaced laterally away from the solids-gas separating compartment and in offset relationship thereto, rather than vertical alignment or completely above the solids-gas separation compartment. The first filtering compartment has at least one first filter to filter a first portion of the dusty gas stream. At least one first compressed air tank communicates with the first filtering compartment. Also, at least one first air injector is operatively connected to the first compressed air tank to inject compressed air with sufficient kinetic energy into the first filter in the first filtering compartment to help clean the first filter. A first intermediate conduit can be provided to pass a portion of the dusty gas stream exiting the solids-gas separating compartment to the first filtering compartment. A first discharge conduit can be connected to the first filtering compartment to discharge the filtered first portion of the dusty gas stream from the first filtering compartment.

In the novel vacuum loader or industrial dust collector with multiple filter compartments, a second filter (filtering) compartment can be positioned generally along side and spaced laterally away from the solids-gas separation compartment and in offset relationship thereto, rather than in vertical alignment or completely above the solids-gas separation compartment. Desirably, the second filtering compartment is spaced laterally away from the first filtering compartment. In a preferred form, the solids-gas separating compartment is spaced between and separates the first filtering compartment and the second filtering compartment. The second filtering compartment has at least one second filter to filter a second portion of the dusty gas stream. At least one second compressed air tank communicates the second filtering compartment. Furthermore, at least one second injector is operatively connected to the second compressed air tank to inject compressed air with sufficient kinetic energy into the second filter in the second filtering compartment to help clean the second filter. A second intermediate conduit can be provided to pass the second portion of the dusty gas stream exiting the solids-gas separation compartment to the second filtering department. A second discharge outlet conduit can be connected to the second filtering department to discharge the filtered second portion of the dusty gas stream from the second filtering compartment.

The novel vacuum loader or industrial dust collector with multiple filter compartments can also include a third filter (filtering) compartment or more filter (filtering) compartments which can be positioned generally along side and spaced laterally away form the solids-gas separating compartment and in offset relationship thereto, rather than in vertical alignment or completely above the solids-gas separating compartment. Desirably, the third filtering compartment is spaced laterally away from both the first filtering compartment and the second filtering compartment. In a preferred form, the solids-gas separating compartment is spaced between and separates the first filtering compartment and the third filtering compartment. At least one third compressed air tank communicates with the third filtering compartment. Also, at least one third air injector is operatively connected to the third compressed air tank to inject compressed air with sufficient kinetic energy into the third filter in the third filtering compartment to help clean the third filter. A third intermediate conduit can be provided to pass the third portion of the dusty gas stream exiting the solids-gas separation compartment to the third filtering compartment. A third discharge outlet conduit can be connected to the third filtering compartment to discharge the third filtered portion of the dusty gas stream to the third filtering compartment.

In an illustrated form, a hopper comprising a bin is positioned below and supports the solids-gas separation compartment and the multiple filter compartments. A vacuum pump can be connected to a motor to draw (suck) influent dusty air through the inlet conduit(s) into the solids-gas separating compartment. Preferably, a sound attenuating device comprising a muffler is provided to dampen noise emitted from the motor and pump.

The vacuum loader or industrial dust collector with multiple filter compartments can provide for kinetic separation of particulate matter from an air stream. The solids-gas separator can provide a kinetic pre-separator prior to the final filtration in the multiple filter compartments with cartridge filters (tubular filters) or other types of filters. The vacuum loader or industrial dust collector can have two, three or more filter compartments (filter housings). At least two of the filter compartments can be laterally spaced from and in offset relationship to the solids-gas separation compartment.

Advantageously, the vacuum loader or industrial dust collector achieved unexpected surprisingly good results with excellent efficiency in the separation of particulate matter from dusty air streams. This may be attributable to greater angular kinetic separation of the particulates along the perimeter or circumference of the perforated tangential cyclone separator or other solids-gas separator. It is also believed that the greater the angular coverage or offset of multiple filter compartments (filtration housings) around the solids-gas separators, the more efficient the gross cut separation of the larger particulates by the solids-gas separator will be. Furthermore, the vacuum loader or industrial dust collector with the perforated tangential cyclone separator provide for superb filtration, dedusting, and purification of the dusty gas stream to provide for cleaner emissions and better compliance with environmental laws and regulations.

In the illustrated embodiment, at least one of the filters in the multiple filter compartments comprises a tubular filter (cartridge filter or canister filter). At least one of the compressed air tanks can comprise an upright compressed air tank that is positioned in proximity to the tubular filter. In some circumstances, it may be desirable to use one or more other types of filters, such as a Hepa-type filter, a bag-type filter, box-type filter, envelope filter, flat filter, or conical filter. More specifically, each of the filtering compartments can have a filtering chamber containing at least one filter, such as a cartridge filter (canister with a tubular filter therein), a Hepa-type filter, a bag-type filter, a box-type filter, an envelope filter, a flat filter, a conical filter, or a set of 2 to 4 or more of the preceding filters. Furthermore, each of the filtering compartments can have an acceleration or kinetic energy chamber to accelerate and/or pass the dusty gas stream with sufficient kinetic energy to remove a substantial amount of particulate of dust from the dusty gas stream before the dusty gas stream enters and passes through the filter(s). The filtering compartment can have nozzle, tubes, or ports, to inject the dusty gas stream into the acceleration chamber. One or more air injectors, shakers, vibrators, or other filter cleaning devices can be provided to periodically clean the filters. In the preferred from, the filtering chamber has a power-operated discharge door to discharge the dust into the bin or hopper. In the illustrative embodiment, the separated and filtered particulates from the dusty air stream are discharged, collected and settled in the collection compartment of a hopper or bin positioned below the solids-gas separation and multiple filter compartments.

As used in this Patent Application, the term "dust" means particulate matter, debris and waste. The dust can comprise particulates of fiberglass, fibrous materials, powder, coal and other minerals, metal slivers and chips, sand, soda ash, steel shot, talconite pellets and other particulate material.

The term "fluid" as used herein means air and other gases and water and other liquids.

The terms "dedust" and "dedusted" as used herein mean removing a substantial amount of dust.

The term "fines" as used herein means small, minute, particulates.

The term "bulk" as used herein means the major portion of the vacuumed materials.

A more detailed explanation of the invention is provided in the following description and appended claims taken in conjunction with the accompanying drawings.

BRIEF DESCRIPTION OF THE DRAWINGS

FIG. 4 is a side view of vacuum loader with a perforated tangential separator in accordance with principles of the present invention;

FIG. 5 is an end view of the vacuum loader with a perforated tangential separator;

DETAILED DESCRIPTION OF THE INVENTION

Figure 1:
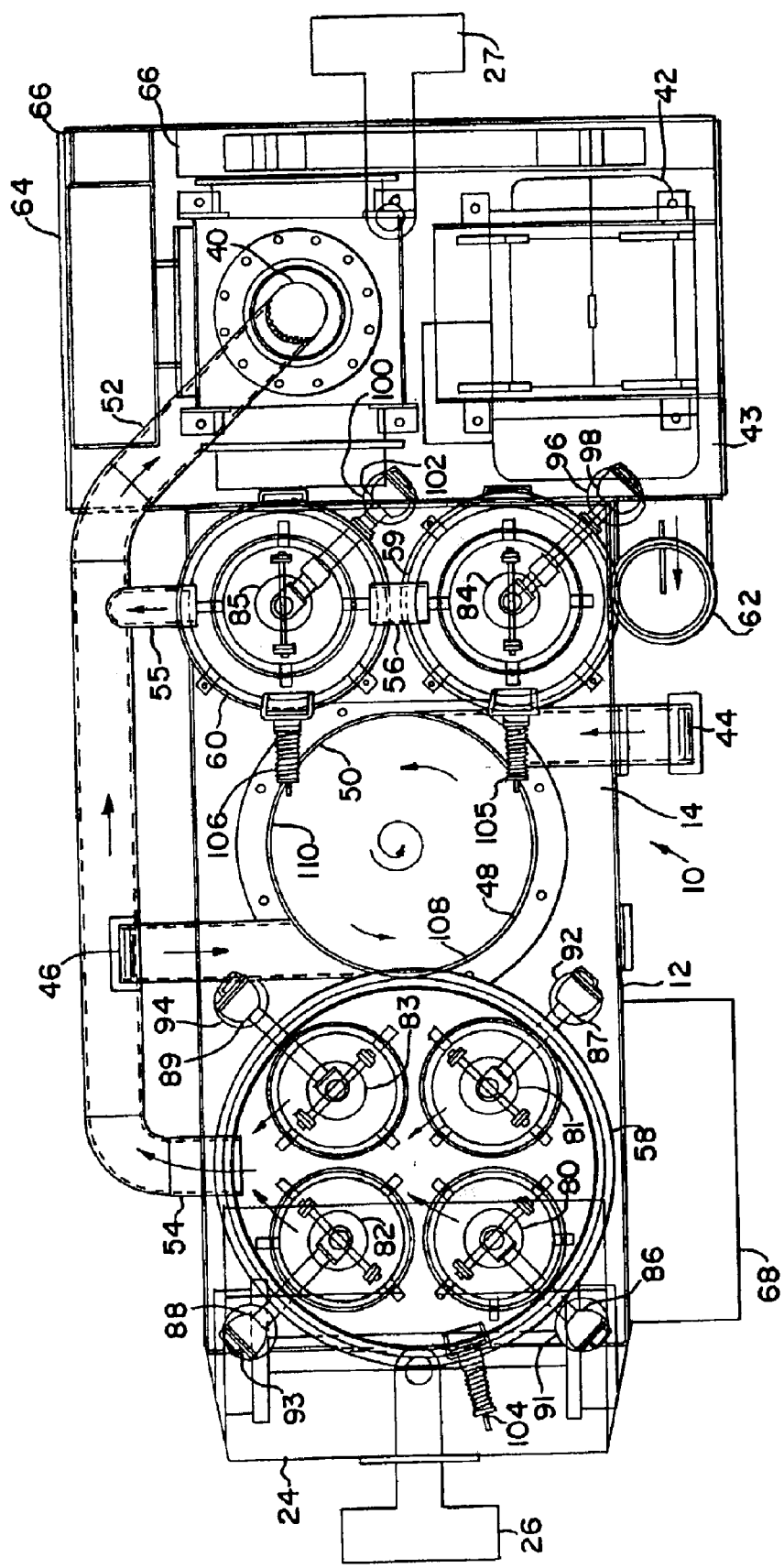
FIG. 1 is a top plan view of a vacuum loader or an industrial dust collector with multiple filter compartments in accordance with principles of the present invention.

A detailed description of the preferred embodiments and best modes for practicing the invention are discussed herein.

An industrial dust collector 10 (FIGS. 1–3) with multiple filter compartments or with multiple filters positioned about one or more solids-gas separators, provides a heavy-duty vacuum-operated machine, industrial vacuum cleaner, vacuum loader and conveyor for efficiently removing, effectively collecting, and safely disposing of particulate matter, debris, and waste. The industrial dust collector can be made of steel or other metal. Other materials can be used.

The vacuum loader or industrial dust collector 10 can have a frame assembly 12 with a base 14 which provides a support platform. The frame assembly can have a cradle 16 (FIGS. 2 and 3) for receiving a hopper 18 comprising a bin such as an end dump hopper. The frame assembly and hopper can be equipped with forklift-channels 20 and 22

(FIG. 3) for receiving and being moved by tines of a forklift truck. The frame assembly can have support members or skids 24 (FIG. 2) with a coupling 26 or tow bar 27 for coupling and attachment to a railway car, truck or other vehicle. Pneumatically-operated expansion bellows can be positioned on bellows support pads of the frame assembly to move the top of the bin flush into sealing engagement against a gasket or seal on the underside of the support platform. Wheels 28–30 (FIGS. 2 and 3) or casters can be mounted on the underside of the base to enable the frame assembly and industrial dust collector to be mobile, portable, moveable, and towable.

The bottom portion of the bin can have a discharge door or valve 32 (FIG. 2) which comprises a slidable (slide) base to discharge the contents in the bin comprising the removed, settled, and collected particulates of dust. The discharge door or valve can be power driven and can be opened and closed by chains 34 and 35 and pulleys 36–39.

A vacuum pump 40 (FIG. 1), compressor, air blower, turbine, or fan and electric motor 42 can be mounted on a support surface 43 or support platform. The vacuum pump (air blower) is operatively connected to and driven by the motor such as by drive belts. The vacuum pump creates a vacuum (suction) to draw dust and direct influent dusty air (air laden with particulates of dust) comprising the dusty gas stream through one or more inlet conduits, such as through a primary inlet conduit 44 and a secondary inlet conduit 46, which provide material inlet ports into a solids-gas separation (separating) compartment 48. In the illustrative embodiment, the dual inlet conduits 44 and 46 are parallel and in offset relationship to each other and are tangential to the solids-gas separation compartment and the solids-gas separator 50 contained therein. The dual inlet conduits direct the flow of the influent dusty gas streams inwardly and in opposing (opposite) directions to create a turbulent or swirling action of the dusty gas streams in the solids-gas separation compartment. The air blower can be connected by an overhead blower line 52 which communicates with discharge outlet conduits (outlets) 54–56 of the upper chambers (upper portions) of the filter (filtering) compartments 58–60 (filter housings). The air blower can also be connected to an exhaust pipe 62 to provide a blower discharge outlet and exhaust to emit the dedusted purified clean gas stream (air) to the surrounding area or atmosphere.

A sound attenuating device 64 (FIG. 2) comprising a muffler with an upright overhead intake 66 can be connected to the air blower and the exhaust pipe to attenuate, muffle, suppress, and decrease noise and vibrations from the air blower (vacuum pump) and motor, and dampen the noise and sound of the purified gases passing and being discharged through the exhaust pipe. An automatic shutoff control panel 68 (FIG. 1) can be mounted on the support platform and connected to a sensor and limit switch in the bin to automatically shut off the air blower or motor when the discharged collected dust in the bin has reached a preselected level. A flexible, elongated intake hose, with an optional nozzle, can be connected to the intake conduit to facilitate collection of the particulate material.

Figure 2:
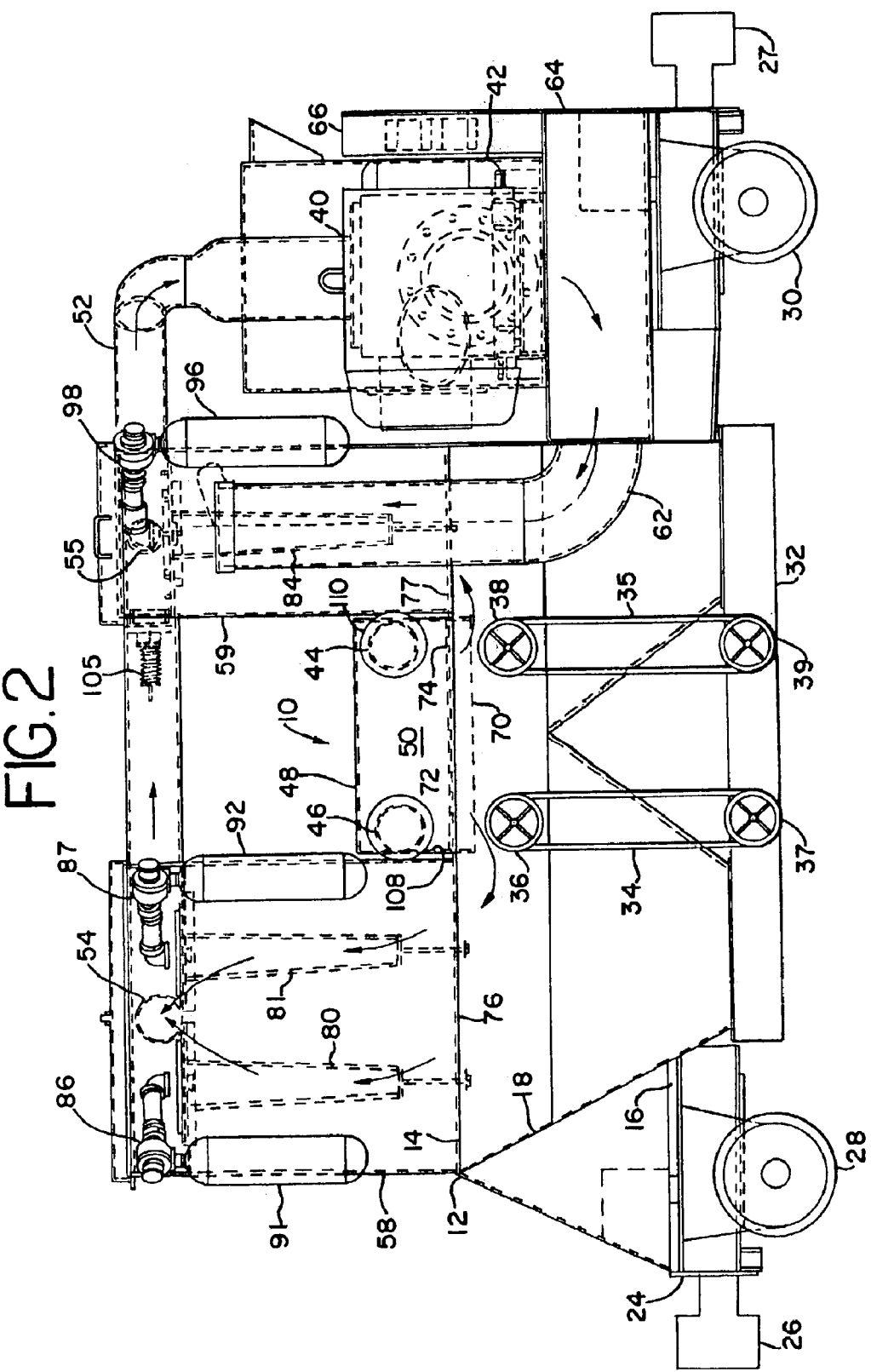
FIG. 2 is a front view of the industrial dust collector (vacuum loader) with multiple filter compartments.
Figure 3:
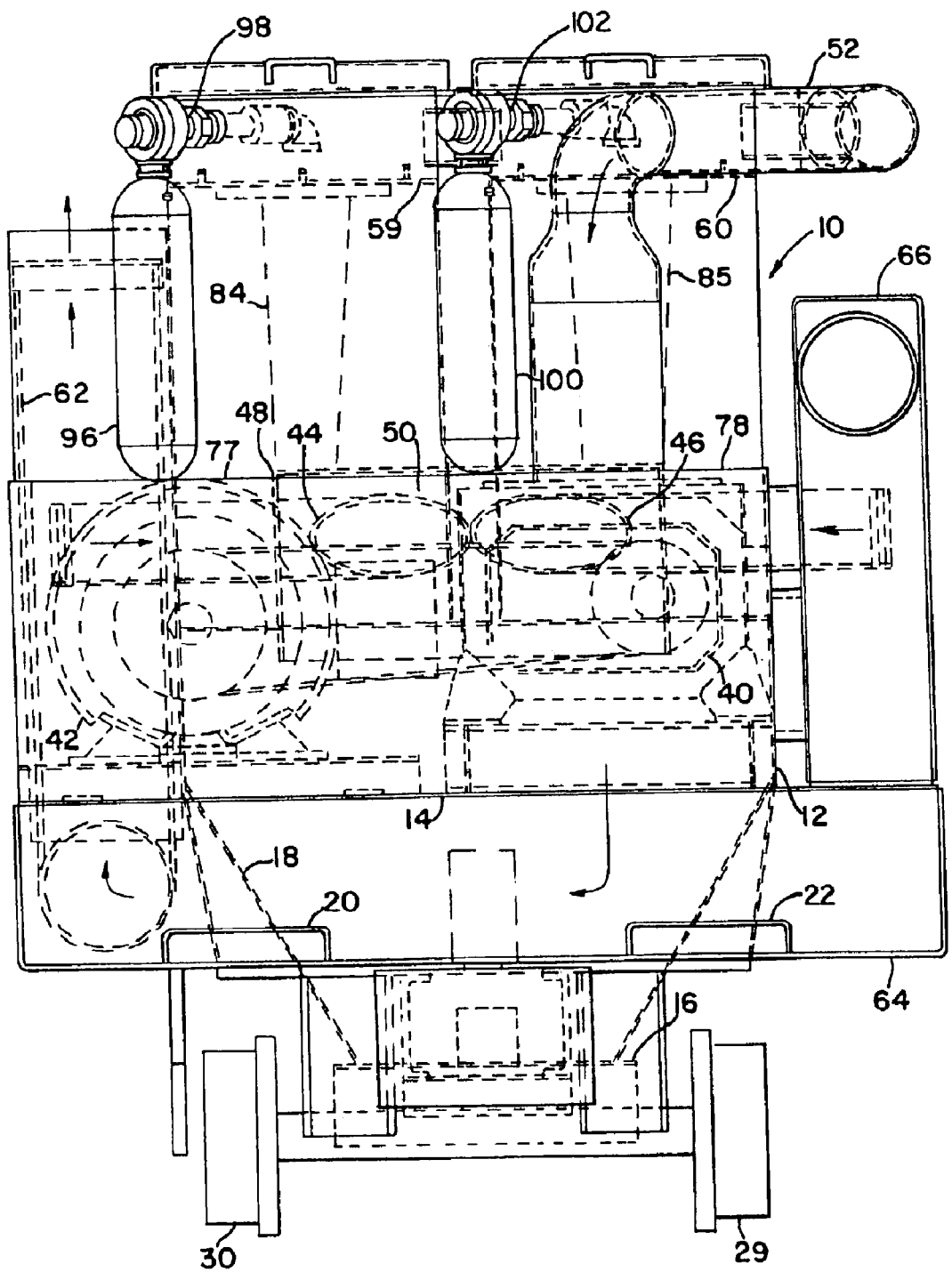
FIG. 3 is a side view of the industrial dust collector (vacuum loader) with multiple filter compartments.

The solids-gas separation compartment 48 (FIG. 2) contains one or more solids-gas separators, preferably comprising tangential cyclone separator 50 with an open bottom 70 providing a circular or circumferential bottom outlet 72 about its circular edge and periphery 74 to discharge larger particulates of dust into the bin. The tangential cyclone separator can comprise a perforated or foraminous tangential cyclone separator, as hereinafter described. The partially dedusted gas stream can exit the solids-gas separating compartment through the bottom outlet or fluid outlet ports (perforations, apertures, holes, passageways, etc.) of the solids-gas separating compartment and pass (flow) upwardly through the open bottoms (filter compartment-inlets) 76–78 (FIGS. 2 and 3) of the filter compartments 58–60. The partially dedusted gas stream of air can pass (flow) upwardly and be filtered by filters 80–85 (FIG. 1) in the filter compartments 58–60 to remove most of the remaining smaller particulates (fines) of dust in the dusty stream. The filtered dedusted air can pass (flow) upwardly and exit and be discharged from the filter compartments through outlets 54–56 (FIG. 1). The filtered air can be drawn through the blower line 52 by the vacuum pump (blower) and can be discharged to the surrounding area and atmosphere by the exhaust pipe 62 (FIG. 2).

The open bottoms of the filter compartments can provide filter discharge openings to discharge the filtered and removed particulates of dust (fines) into the bin. The filter (filtering) compartments can have horizontal floors comprising normally closed, power-operated, discharge hatches, flaps, or doors which can be mounted on rollers and connected by suitable air or hydraulic cylinders powered by external compressed air tanks or hydraulic pumps.

The first filter compartment 58 can have a first filter chamber that contains a plurality, set, or array of canister filters (annular filters or cartridge filters) 80–84 (FIG. 1). The partially dedusted gas stream can flow upwardly, annularly, and laterally through each filter of the first filter compartment to remove substantially all the remaining particulates of dust. In the illustrative embodiment, the first filter compartment contains a set of four canister filters 80–83 which are positioned in a circular array. Each of the canister filters can contain a vertically V-shaped retainer. While the preceding arrangement is preferred for best results, more or less filters or different types of filters can be used, if desired. The set of first filters 80–83 in the first filter compartment remove the fines (minute fine dust particles) and substantially all the remaining particulates of dust in the dusty gas stream flowing through the first filter compartment to produce a dedusted purified gas (air) stream.

A discharge outlet conduit (FIG. 1) can be connected to and communicate with the upper clean air chamber (plenum) of the first filtering (filter) compartment to provide an outlet and passageway through which the purified, dedusted and filtered air is drawn from the first filtering compartment via the blower line 52 into the vacuum suction pump (air blower) and muffler for discharge via the exhaust pipe to the atmosphere or area surrounding the industrial dust collector.

Reverse pulse filter cleaners comprising air injectors 86–89 (FIGS. 1 and 2) can be mounted and extend to the interior of the upper air chamber of the first filtering compartment to periodically inject intermittent blasts comprising pulses of compressed clean air upon the inside (interior) of the filters to help clean the filters. The injectors can be connected by pneumatic tubes or conduits to an air supply source, such as compressed air tanks comprising compressed air canisters, or an auxiliary compressor. In the illustrative embodiment, there is a circular array or set of four upright compressed air canisters (compressed air tanks) 91–94 (FIGS. 1 and 2) mounted about the exterior surface of the cylindrical upright wall of the first filtering compartment and there is a circular set or array of four downwardly facing, overhead air injectors positioned above the centers of the filters and connected to the compressed air canisters to sequentially inject pulses of compressed air into the center of the tubular filters to shake loose the dust collected, accumulated, or the outside of the filter walls. More or less air injectors and compressed air canisters can be used. While the illustrated arrangement is preferred for best results, a different shaped array or orientation of air injectors and/or air canisters (compressed air tanks) can be used, if desired. The filtered removed dust collected and accumulated on the bottom of the first filtering (filter) compartment can be discharged into the bin when the blower is turned off or by actuation of the control panel and/or when the discharge door or bottom of the first filter compartment is open.

As described previously, the industrial dust collector with multiple filter (filtering) compartments provides an effective industrial vacuum cleaner, vacuum loader and conveyor. The vacuum loader or industrial dust collector with multiple filter compartments has at least one solids-gas separation (separating) compartment containing at least one solids-gas separator. Desirably, the solids-gas separator provides gross separation to remove large particulates (particles) of dust from an influent dusty gas stream (e.g. dust laden air) to attain a grossly separated effluent dusty stream having a lower concentration of particulates of dust by weight than the influent dusty stream. The solids-gas separator can comprise a tangential cyclone separator. The tangential cyclone separator provide an offset deflector cyclone for kinetic separation of material from the influent dusty stream (air flow). The solids-gas separator can also have a barrier wall portion comprising an impact plate. The solids-gas separating compartment has an inlet conduit (intake) to feed the influent dusty stream to the tangential cyclone separator. The solids-gas separating compartment also has a separator outlet (exit) conduit to discharge the partially dedusted, grossly separated, effluent dusty stream from the solids-gas separating compartment.

The vacuum loader or industrial dust collector with multiple filter (filtering) compartments preferably has two or more filter (filtering) compartments, including a first filter (filtering) compartment with a first filtering chamber. The first filtering chamber preferably contains a set of first tubular filters (cartridges or canisters) to filter smaller particulates of dust from a first portion of the grossly separated effluent dusty stream from the solids-gas separating compartment to provide a first filtered stream having a lower concentration of -particulates of dust by weight than the grossly separated effluent dusty stream. A set of first compressed air tanks communicates with the first filtering compartment. Desirably, an array, set or series of first air injectors are operatively connected to the first compressed air tanks to intermittently inject pulses or blasts of compressed air with sufficient kinetic energy to the set of first filters in the first filtering compartment to help clean the set of first filters in the first filtering compartment. Advantageously, the first filtering compartment is positioned generally along side and is spaced laterally away from the solids-gas separating (separation) compartment and in offset relationship thereto, rather than in vertical alignment or completely above the solids-gas separating compartment. A first intermediate conduit can communicate with the separator-outlet conduit and the first filter (filtering) compartment to pass the first portion of the grossly separated effluent dusty stream from the solids-gas separating compartment to the first filtering compartment. A first discharge (outlet) conduit 54 (FIG. 1) can be provided to discharge the first filtered stream from the first filtering compartment.

The vacuum loader or industrial dust collector with multiple filter compartments can have a second filter (filtering) compartment 59 (FIGS. 1 and 2) containing at least one second filter 84 to filter smaller particulates of dust from a second portion of the grossly separated effluent dusty stream from the solids-gas separating (separation) compartment to provide a second filtered stream having a lower concentration of particulates (particles) of dust by weight than the grossly separated effluent dusty stream. Desirably, at least one second compressed air tank 96 (FIGS. 1–3) comprising a compressed air canister communicates with the second filtering compartment. Also, at least one second air injector 98 is operatively connected to the second compressed air tank to intermittently inject pulses or blasts of compressed air with sufficient kinetic energy to the second filter in the second filtering compartment to help clean the second filter in the second filtering compartment. Desirably,the second filtering compartment is positioned generally along side and spaced laterally away from the solids-gas separating compartment and in offset relationship thereto, rather than in vertical alignment or completely above the solids-gas separating compartment. Preferably, the second filter (filtering) compartment is also spaced laterally away from the first filter (filtering) compartment, rather than in vertical alignment with the first filter compartment or positioned completely above the first filter compartment. In the illustrative embodiment, the solids-gas separating compartment is positioned and spaced between and separates the first filtering compartment and the second filtering compartment. A second intermediate conduit can communicate with the separator-outlet conduit and the second filtering compartment to pass the second portion of the grossly separated effluent dusty stream from the solids-gas separating compartment to the second filtering compartment. A second discharge (outlet) conduit 56 (FIG. 1) can be provided to discharge the second filtered stream from the second filtering compartment.

The vacuum loader or industrial dust collector with multiple filter compartments can have a second filter (filtering) compartment 59 (FIGS. 1 and 2) containing at least one second filter 84 to filter smaller particulates of dust from a second portion of the grossly separated effluent dusty stream from the solids-gas separating (separation) compartment to provide a second filtered stream having a lower concentration of particulates (particles) of dust by weight than the grossly separated effluent dusty stream. Desirably, at least one second compressed air tank 96 (FIGS. 1–3) comprising a compressed air canister communicates with the second filtering compartment. Also, at least one second air injector 98 is operatively connected to the second compressed air tank to intermittently inject pulses or blasts of compressed air with sufficient kinetic energy to the second filter in the second filtering compartment to help clean the second filter in the second filtering compartment. Desirably, the second filtering compartment is positioned generally along side and spaced laterally away from the solids-gas separating compartment and in offset relationship thereto, rather than in vertical alignment or completely above the solids-gas separating compartment. Preferably, the second filter (filtering) compartment is also spaced laterally away from the first filter (filtering) compartment, rather than in vertical alignment with the first filter compartment or positioned completely above the first filter compartment. In the illustrative embodiment, the solids-gas separating compartment is positioned and spaced between and separates the first filtering compartment and the second filtering compartment. A second intermediate conduit can communicate with the separator-outlet conduit and the second filtering compartment to pass the second portion of the grossly separated effluent dusty stream from the solids-gas separating compartment to the second filtering compartment. A second discharge (outlet) conduit 56 (FIG. 1) can be provided to discharge the second filtered stream from the second filtering compartment.

The vacuum loader or industrial dust collector with multiple filter compartments can also have a third filtering compartment 60 (FIG. 1) containing at least one third filter 85 to filter smaller particulates of dust from a third portion of the grossly separated effluent dusty stream from the solids-gas separating compartment to provide a third filtered stream having a lower concentration of particulates (particles) of dust by weight than the grossly separated effluent dusty stream. At least one third compressed air tank 100 (FIGS. 1 and 3) comprising a compressed air canister, communicates with the third filtering compartment. Desirably, at least one third air injector 102 is operatively connected to the third compressed air tank to intermittently inject pulses or blasts of compressed air with sufficient kinetic energy to the third filter in the third filtering compartment to help clean the third filter in the third filtering compartment. Advantageously, the third filter (filtering) compartment is positioned generally along side and is spaced laterally away from the solids-gas separating compartment and in offset relationship thereto, rather than in vertical alignment or completely above the solids-gas separating compartment. Advantageously, the third filtering compartment is spaced laterally away from the first filtering compartment rather than in vertical alignment with the third filtering compartment or positioned completely above the first filtering compartment. Preferably, the third filtering compartment is also spaced laterally away from the second filtering compartment rather than in vertical alignment with the second filtering compartment or positioned completely above the second filtering compartment. In the illustrative embodiment, the solids-gas separating compartment is positioned and spaced between and separates the first filtering compartment and the third filtering compartment. Also, in the illustrative embodiment, the second filtering compartment is positioned generally along side the third filtering compartment. Furthermore, the first filtering compartment can comprise sections or portions which are diametrically opposite or opposed to sections or portions of the second filtering compartment and the third filtering compartment. A third intermediate conduit 56 (FIG. 1) can communicate with the separator-outlet conduit and the third filtering compartment to pass the third portion of the grossly separated dusty stream from the solids-gas separating compartment to the third filtering compartment. A third discharge (outlet) conduit 55 (FIG. 1) can be provided to discharge the third filtered stream from the third filtering compartment.

In the illustrative embodiment, the blower line 52 (FIG. 1) extends between, connects, and communicates with the first and third outlet conduits 54 and 55 of the first and third filter compartments. Also, the third intermediate conduit 56 (FIG. 1) extends between and communicates with the second and third filtering compartments. The third intermediate conduit 56 can also comprise or be integral with the second discharge conduit so that the third portion of the grossly separated effluent dusty stream also comprises the second filtered stream. Each of the multiple filter (filtering) compartments can have a pressure (vacuum) relief valve 104, 105, or 106 (FIG. 1).

In the preferred embodiment, the air injectors are positioned at an elevation above the filters, pump, motor, and tangential cyclone separator. The second filter in the second filtering compartment can comprise a tubular filter (cartridge filter or canister filter). Furthermore, the third filter in the third filtering compartment can also comprise a tubular filter (cartridge filter or canister filter). While tubular filters are preferred for more effective filtering, in some circumstances it may be desirable to use one or more other types of filters, such as Hepa-type filters, bag-type filters, box-type filters, envelope filters, flat filters, or conical filters. Moreover, it may be desirable to have more than one filter in the second filter (filtering) compartment and in the third filter (filtering) compartment. Also, while the illustrative embodiment has three separate filter (filtering) compartments, in some circumstances it may be desirable to have two filter (filtering) compartments or more than three filter (filtering) compartments or an array, series, set, or plurality of filters positioned concentrically, eccentrically, or about one or more solids-gas separating compartments, either in a single annular filter compartment or in an array, series, set, or plurality of filter compartments.

In the illustrative embodiment, the hopper comprising a bin is positioned below and supports the solids-gas separating (separation) compartment, as well as supports the first, second and third filtering compartments. The bin has a collection compartment or chamber to receive and collect the large particulates of dust removed by the solids-gas separator and the smaller particulates (fines) removed by the filters of the multiple filter compartments. The bin can comprise a stationary bin, a moveable bin, a portable bin, and/or a towable bin. Preferably, the bin has a lower portion with a power-operated slideable door 32 (FIG. 2) to discharge the collected particulates (particles) of dust from the bin.

In the illustrative embodiment, the motor 42 (FIG. 1) is positioned in proximity to the second filter (filtering) compartment. Preferably, the second filter (filtering) compartment is disposed and positioned between the solids-gas separating compartment and the motor. The vacuum pump (blower) can be operatively connected to the motor to draw the influent dusty stream through one or more inlet conduits 44 and 46 (FIGS. 1–3) into the solids-gas separating compartment. The vacuum pump can be positioned in proximity to the third filtering compartment. In the illustrative embodiment, the third filtering compartment is disposed and positioned between the solids-gas separating compartment and the vacuum pump. A base providing a support surface can be provided to support the vacuum pump and motor. Preferably, the base comprises and/or also supports a sound attenuating device which provides a muffler to dampen noise emitted from the motor and pump.

In operation, air laden with entrained particulates of debris, waste and other dust is drawn by the blower through the dual intake conduits 44 and 46 (FIGS. 1–3) into the tangential cyclone separator 50 in the solids-gas separation compartment 48. The tangential cyclone separator (cyclone) swirls the dusty air tangentially along the inside surface of the gas-solids separation compartment and ejects the effluent partially dedusted air upwardly into the multiple filter compartments. The removed particulates are discharged by gravity downwardly into the bin through the bottom outlet of the solids-gas separation compartment.

The partially dedusted, grossly separated dusty air can exit from the bottom edge or fluid outlet ports of the tangential cyclone separator and pass upwardly through the multiple filter compartments comprising the first, second, and third filter (filtering) compartments. The filters in the multiple filter compartments remove most of the remaining small particulates comprising fine particles (fines) of dust from the dusty stream to provide a purified, dedusted stream of cleaner air which is drawn through the blower line by the air blower (vacuum pump) and is discharged through the outlet stack comprising the exhaust pipe. The air injectors cooperate with the compressed air tanks for intermittent reverse air-pulse cleaning of the filters in the multiple filter compartments while vacuuming during operation of the industrial dust collector. The collected filtered fine particles of dust (fines) are discharged through the open bottoms of the multiple filter compartments into the bin.

The industrial dust collector provides a heavy duty, vacuum operated machine, industrial vacuum cleaner, vacuum loader, and conveyor to efficiently remove, effectively collect, and safely dispose of particulate matter, debris, and waste. The tangential cyclone separator makes a gross cut and partially dedusts the dusty influent air, gas and/or liquid. The tangential cyclone separator can be orientated and arranged to direct and blow the dusty air, gas and/or liquid counterclockwise or clockwise, so that the dusty air, gas and/or liquid flows downwardly through the solids gas separation compartment, laterally through the upper portion of the bin or hopper, and upwardly through the multiple filtering compartments. Instead of or in addition to the tangential cyclone separator, the solids-gas separator can comprise a curved barrier wall 108 (FIG. 1) or angled impact plate separator 110 (strike plate). The tangential cyclone separator, curved barrier wall, and impact plate separator all provide a deflector(s) comprising an impingement surface(s) which changes the direction of the incoming dusty gas stream and grossly separates and removes the larger particulates of dust from the influent dusty gas stream.

As discussed previously, in the illustrative embodiment, the first filtering compartment or filter compartment is positioned along side and spaced laterally rearwardly and away from the solids-gas separation compartment and in offset relationship thereto, as is the second and third filtering compartments, rather than vertically above the solids-gas separation compartment. The open bottom portion of the filtering compartments can provide inlets opening for entrance of the partially dedusted stream of air, gas and/or liquid from the tangential cyclone separator. The lower portion and annular outer portion of each of the filtering compartments can provide an acceleration or kinetic chamber which accelerates and/or passes the dusty air and/or liquid upwardly with sufficient kinetic energy to remove a substantial amount of particulates of dust from the dusty air and/or liquid before the dusty air and/or liquid enters and passes through the filter(s) in the filter chambers of the multiple filtering compartments.

As previously described, the inner central portion of the first filtering (filter) compartment provides a first filter chamber that can contain at least one filter to filter, dedust, and remove substantially all of the remaining particulates of dust in the upwardly flowing stream of dusty air and/or liquid in the first filtering compartment. The first filtering compartment can contain a concentric set or series of tubular filters (canister filters). The first filtering compartment can have a set or series of four air injectors which are connected by compressed air lines or conduits to compressed air tanks to sequentially inject intermittent pulses of air on the filters to clean the set of first filters. In some circumstances, it may be desirable to use other types of filter cleaning equipment, such as mechanical shakers and vibrators, or more or less filters.

The multiple filter (filtering) compartments can have one or more Hepa-type filters, bag-type filters, or box-type filters instead of one or more tubular filters (canister filters) contained therein. The Hepa-type filters, bag-type filters, box-type filters, envelope filters, flat filters, or conical filters, substantially filter, dedust, and remove substantially all of the remaining particulates of dust from the upwardly moving stream of dusty air and/or liquid in the multiple filtering compartments. If desired, more than one Hepa-type filter, bag-type filter, box-type filter, envelope filter, flat filter, or conical filter, can be used. Other types of filters can also be used.

It has been unexpectedly and surprisingly found that in many situations the industrial dust collectors with the perforated tangential cyclone separator provided unexpected, surprisingly good results efficiently removing greater quantities of dust.

The vacuum loader 210 of FIGS. 4–9 provides a moveable heavy duty vacuum operated machine, portable industrial dust collector and waste material collector-separator. The vacuum loader 210 comprises a multiple step stage separator system, such as a three stage separator system with a first stage direct separation unit 212 (FIG. 9), a second stage perforated tangential separation unit 214 (FIGS. 4, 5, 7 and 8) and a third or multiple stage filtering unit 222. The perforated tangential separation unit comprises a perforated plate foraminous tangential cyclone separator 214. The vacuum loader 210 efficiently and effectively removes, compactly contains, and safely separates from the fluid or air stream particulates consisting primarily of dusty particulate material comprising dry, wet, or fluid entrained, flowable matter, such as fibers, slivers, chips, granular material, fibrous material, pellets, chunks, powders, slurries, liquids, debris, coal and other minerals, soda ash, dense and heavy material, such as steel shot and talconite pellets, hazardous matter, waste and other dusty particulate material. The heavy duty industrial vacuum loader can be-used in compact places, such as underground mines, and in other locations.

The vacuum loader 210 (FIGS. 4–9) can have a second stage separator unit 214 (FIGS. 4, 5, 7, and 8) with a reinjection airlock unit 216 (FIG. 4) and a third or multiple stage filtering system 222. The vacuum loader 210 has a flexible inlet vacuuming hose 224 (FIG. 5) with a bulk vacuuming nozzle 226 to vacuum an influent fluid containing particulate material, such as from a material spill pile, under substantially continuous negative pressure. A reinjection unit 216 has a reinjection tee 232 with a reinjection transition 234 (FIG. 4) which provides a receiving transition to receive influent dusty fluid carryover from the perforated tangential separator 214. The reinjection unit 216 has an upright airlock feeder 236 which extends upwardly from the reinjection transition 234 and communicates with the tangential separator 214 to feed separated material from the perforated tangential separator 214 downwardly into the reinjection transition tee. A flexible vacuuming hose 238 discharges the dusty fluid and particulate material from the reinjection tee to the inlet connection port 239 (FIG. 9) of the bulk separator 212.

The gross cut rotary bulk separator 212 (FIG. 9) grossly separates the particulate material from the fluid deposit onto a bulk material receiver 218, such as a belt conveyor, bin, or receiver, providing a material collection chamber, which is positioned below the gross cut rotary bulk separator 212 to receive, convey or transport the particulate laden stream from the gross cut rotary bulk separator 212 to a collection and processing site. A bulk separator-fluid outlet hose 240, also referred to as a bulk separation discharge hose and a tangential separator-inlet hose, is connected to and communicates with the outlet port 242 of the gross cut rotary bulk separator 212 and the inlet port 262 (FIGS. 5, 7 and 8) of the tangential separator 214 to pass the grossly separated fluid stream from the gross cut rotary separator 212 to the perforated tangential separator 214.

The gross cut rotary bulk separator 212 (FIG. 9) has a bulk separation chamber. The bulk separator 212 also has a fluid outlet port 242 which communicates with the bulk separator-fluid-outlet hose 240 to exit the grossly separated fluid stream into the tangential separator 214. The gross cut bulk separator 212 further has a downwardly facing bulk material outlet to discharge the particulate laden stream onto the bulk material receiver 218 comprising a belt conveyor, bin or a receiver.

The perforated plate tangential separator 214 (FIGS. 5 and 7) preferably comprises a perforated foraminous plate tangential entry centrifugal cyclone separator to partially dedust and separate the carry over dust from the grossly separated fluid stream. The perforated plate tangential cyclone separator minimizes turbulence, clogging and reentrainment of particulates. The perforated tangential entry cyclone separator 214 can have a cyclone housing 252 (FIG. 7), with an upright vertical perforated foraminous wall 253 comprising an upright vertical curved circular perforated cyclone wall plate, a circular exterior surface 254 and a circular inner surface 256 surrounding a cyclone interior 258 about a central cyclone portion 260. A cyclone inlet 262 can be connected to and communicate with the bulk separator-fluid-outlet hose 240 to receive the grossly separated fluid stream and carryover dust from the bulk separator-fluid-inlet hose 240. The cyclone inlet 262 preferably comprises a tangential intake conduit 264 which extends linearly and outwardly from the circular surface of the annular wall of the cyclone housing 252 and communicates with the cyclone interior 258.

Figure 7:
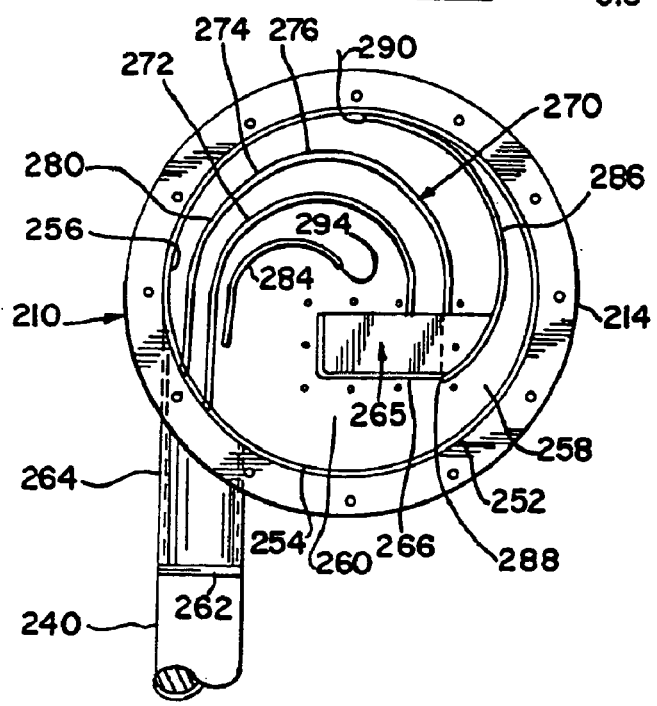
FIG. 7 is a top view of the perforated tangential separator.
Figure 8:
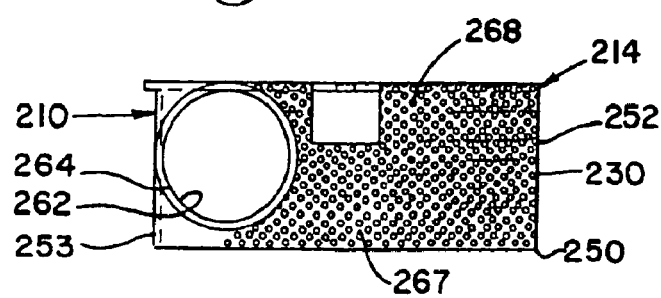
FIG. 8 is a front view of the perforated tangential separator.

As shown in FIG. 7, the perforated tangential cyclone separator 214 can have cyclone outlet openings in the central cyclone portion 260 (FIG. 7) with a downwardly facing lower particulate cyclone outlet 266 comprising a downwardly facing cyclone outlet port to discharge the separated carry over dust (particulate material) downwardly form the perforated tangential entry cyclone separator into the airlock feeder 236 (FIGS. 4 and 5). The upright curved cyclone wall plate 253 (FIG. 8) has a perforated section (portion) 267 with perforations 268 providing radial fluid cyclone outlet ports 268 to pass and discharge the partially dedusted fluid radially outwardly from the perforated tangential entry cyclone separator 214 into the filtering unit(s) 222 (FIGS. 4 and 5) above. The perforated tangential cyclone separator can have an imperforate or perforated foraminous top closure plate 265 (FIG. 7).

The perforations 268 (FIGS. 5 and 8) can comprise an array, set, series, pattern, curved rows, parallel rows, staggered rows, or aligned rows of vent holes, apertures, passageways, radial openings, slits, slots, offset holes, or fluid outlet ports. The holes can be circular, oval, elliptical, square, rectangular, or polygonal. preferably upright, vertical and face radially outwardly. The perforated area 267 and perforations 268 can extend from 1 to 360 degrees, preferably 60 to 300 degrees, and most preferably 180 degrees. The perforated area 267 and 268 can also be spaced from the cyclone inlet 262 and tangential intake conduit 264 (FIG. 7) from 30 to 330 degrees, preferably 60 to 330 degrees, and most preferably 90 top 270 degrees. The perforations 268 can occupy 3% to 95% and most preferably from 10% to 65% of the perforated area (portion) 267 of the upright curved cyclone wall plate 253.

The perforations 268 (FIGS. 5 and 7) provide for more thorough separation of the particulates (material) from the air or fluid stream. The majority of the material on the inside of the perforated tangential cyclone separator 214 and air or other fluid are kinetically separated in the perforated tangential cyclone separator 214 and flow radially outwardly through the cyclone plate perforations 268. This arrangement also preliminarily vents (prevents) the air or other fluid within the cyclone walls of the perforated tangential cyclone separator 214 so as to decrease turbulence outside the perforated tangential cyclone separator 214 and the material collection chamber 218 (FIG. 9) below.

The perforated plate tangential entry cyclone separator 214 (FIG. 7) can have a set of directional vanes 270 which extend between the cyclone inlet 262 and the cyclone outlet openings 266 and 268 to change and vary the direction of flow of the fluid stream and enhance separation of the dusty particulates from the fluid. The directional vanes 270 can help minimize and prevent clogging, backup and piling up of particulates in the perforated tangential separator 214. The directional vanes 270 can include a pair of central vanes 272 and 274 with parallel portions 276. The central vanes 272 and 274 can be connected to and communicate with the cyclone outlet openings 266 and 268. The directional vanes 270 can have curved portions 280. The directional vanes can also include an arcuate baffle 284 comprising a convex barrier which can be spaced from the cyclone inlet 262 and the outlet openings 266 and 268. The convex barrier 284 is positioned inwardly of the central vanes 272 and 274. The directional vanes 270 can further include a concave deflector 286 can have an outlet end 288 connected to the outlet openings 266 and 268 and an inlet end 290 which can be connected to the inner surface 256 of the annular wall 252 of the cyclone housing 250. The vanes 270 can also have beveled or inclined ends 294 to enhance particle separation.

The airlock feeder 236 (FIG. 5) extends downwardly from and communicates with the perforated tangential entry cyclone separator 214 for particulate material to be removed from the tangential entry cyclone separator into the reinjection tee 232. The reinjection airlock feeder and feed system 236 can have dual valves, a rotary air lock valve, a pinch type air lock valve, or any other air lock feed valve system.

A filtering unit 222 (FIGS. 4 and 5) comprising a single or multiple filtering compartments can be positioned above and communicate with the perforated tangential entry cyclone separator 214. The filtering unit 222 can have a filtration chamber 310 with a set of canisters 312–315 (FIG. 6) containing tubular filters 316–319 which can be spaced along side each other to filter the partially dedusted fluid. The tubular filters 316–319 can surround a central cartridge filter 326 (FIG. 4). The filtering unit 222 preferably includes a series or set of injectors 320–323 (FIG. 6) to periodically inject intermittent blasts of air upon the tubular filters 316–319 to help clean the tubular filters 316–319. In some circumstances, it may be desirable to use more or less filters, different types of filters, additional filters, such as Hepa-type filters, or other types of filter cleaning equipment, such as mechanical shakers and vibrators. Furthermore, if desired, the filtering compartment can also have ports, slots, tubes, or nozzles for passing, conveying, and injecting the partially dedusted fluid containing fines and smaller particulates into the filter compartment.

A vacuum pump 330 (FIG. 5) can communicate with the filtering unit 222 and the hoses 224, 238 and 240 to draw fluid through the filtering unit and the hoses under suction and negative pressure. The vacuum pump 330 can comprise a compressor, pneumatic pump, air blow, fan, or turbine. The vacuum loader also has a vacuum relief valve 328 (FIG. 6) and a drive motor package 332.

The vacuum loader 210 (FIG. 1) is preferably equipped with a muffler assembly 340, most preferably a silencer base muffler assembly, to provide a sound abatement control unit in the mine to muffle, quiet, and abate the noise and sound level of the purified clean filtered fluid exiting the filtering unit 222 as well as to help suppress operational noises from the vacuum pump 330. The muffled purified air can exit through a vent pipe 354 and vent flap 356 to the atmosphere. The muffler assembly 340 preferably has a silencer base 342 and vent flap 356 to the sound attenuating chamber 344 and a box-like muffler rectangular support housing 346 positioned in proximity to and along the side of the filtering unit 222 and the vacuum pump 330. The muffler support housing 346 can have an upper flat or planar support surface 348 comprising a top plate and ceiling of the silencer base to support and dampen the vibrations of the vacuum pump 330. The internal composite sound attenuating chamber 344 can have an internal, reverse direction, zigzag channel which communicates with the filtering unit to vary the direction of flow of the filtered fluid in a zigzag, sinusoidal, or square wave flow pattern. Acoustical metal, wooden, or plastic muffler baffles in the channels are covered with sound insulating material, such as acoustical sound absorption foam, mineral wool, or fiberglass insulation, to dampen and decrease the noise of the filtered fluid passing through the channel to safe and comfortable levels before it is discharged from the vacuum loader 210 through an exhaust pipe 354. The acoustical baffles include upward composite muffler baffles and downward composite muffler baffles. The upward muffler baffles of the muffler housing to a position cantilevered to and extend upwardly from the floor of the muffler housing to a position spaced below the ceiling of the muffler housing. The downward baffles of the muffler assembly are cantilevered and extend downwardly from the ceiling of the housing to a position spaced below the ceiling of the muffler housing. The downward bafflers of the muffler assembly are cantilevered and extend downwardly from the ceiling of the housing to a position spaced above the housing floor. The upward baffler are positioned and spaced between the downward baffles. The composite downward and upward baffles provide gas impervious, air impermeable, lateral barriers which extend laterally across and connect the sides of the muffler housing to block and deflect the longitudinal flow of filtered, dedusted, purified clean fluid and concurrently direct the clean fluid in the reverse direction channel so as to reduce the noise of the filtered, dedusted, purified clean fluid passing through the sound attenuating chamber.

The second stage separation and filtration unit has a perforated foraminous tangential entry cyclone separator 214 (FIGS. 4 and 5) which is spaced laterally and externally of the rotary bulk separator 212 (FIG. 9) of the first stage bulk separation unit. The perforated tangential cyclone separator 214 dedusts, separates, and removes a substantial amount of particulates from the effluent partially dedusted fluid from the rotary bulk separator 212 of the first stage bulk separation unit.

The vacuum loader 210 can also have a control panel, which when energized and activated, provides voltage and power for the operation of a solenoid valve connected to a vacuum breaker, as well as four solenoid air valves connected to the filter cartridge's reverse pulse cleaning circuit, and two solenoid air valves connected to the reinjection system's air lock valves. The electrical control panel can be equipped with: a vacuum pump gauge, vacuum differential gauges, a filter differential gauge, switches, start/stop push buttons, a cartridge filter cleaning pulse timer circuitry package, indicating lights, relays, and a timer/circuitry package for the reinjection system. The vacuum loader 210 can have a pneumatic circuit and valves for operation a vacuum breaker, reinjection system air lock valves, and reverse airpulse circuit.

The vacuum pump engine or motor packages can be equipped with a drive guard, base, engine or motor vacuum pump controls, gauges, exhaust silencer, starter switch, and throttle. The vacuum loader 210 can also have an engine or motor driven compressed air package to provide compressed air for reverse air-pulse filter cleaning and the air actuated valves.

The vacuum loader 210 can be mounted upon a towable, over the road, trailermounted frame, such as a 10,000 lb. load capacity over-the-road tandem axle trailer. The trailer can be equipped with hydraulic surge brakes, a break-away emergency brake system, emergency brakes, a lighting system, break-away chains, and jack stands. The trailer can be towed by a truck. The trailer can have a main frame made of carbon steel, stainless steel, anodized steel, or other metal. The trailer can have a tow bar which can extend longitudinally outwardly from an abutment plate or flange plate along the longitudinal centerline of the trailer assembly. The tow bar can have a drum ball tow coupler and tow hitch to enable the vacuum loader 210 to be pulled to the collection or storage site by a tow truck, mine vehicle or other suitable vehicle equipped with a mating tow bar, ball, or hitch. The vacuum loader 210 can also be carried by a vehicle. The tow bar can be connected to a top wind jack with an upper crank and lower base plate or foot. Other wind jacks can be connected to other portions of the trailer. Jacks are useful to level, stabilize, and balance the trailer and vacuum loader 210 on the ground, floors and other surfaces at the collection site during stationary vacuum operation of the vacuum loader 210. The underframe of the trailer assembly can includes a set of wheel assemblies positioned about the middle of the trailer. The wheel assemblies can comprise four wheels and can have oil lubricated hub and rums, electric brakes, and tandem axles. The trailer assembly can also have a hydraulic surge braking system and a fire extinguisher. A gas tank with a gas inlet tube can be mounted to the trailer assembly. A battery can be seated upon and secured to the trailer assembly. The gas tank and battery can be connected to a drive engine package mounted on the trailer assembly.

Operation

The vacuum loader 210 (FIG. 9) with the rotary bulk separator 212, perforated tangential separator 214 (FIGS. 4 and 5), filtering system 222 and the reinjection system 216 effectively, efficiently, and safely collect and discharge fibers, dust laden liquids, dry dusty materials, contaminated sand and soil, silvers, chips, granular material, pellets, chunks, powders, slurries, liquids, debris, coal and other minerals, soda ash, metals, dense and heavy material, such as steel shot and talconite pellets, hazardous matter, waste, and other particulate material. Additionally, the vacuum loader 210 provides a total vacuuming system which is under continuous negative pressure from the vacuuming hose inlet port to the vacuum producing pump inlet port during all vacuum cycles throughout the operating day and shift.

The gross cut rotary bulk separator 212 (FIG. 9) grossly separates the particulate material from the influent air or other fluid into a particulate laden stream containing the bulk of the particulate material and a grossly separated fluid carryover dust having entrained residual particulate material. The gross cut rotary bulk separator 212 has a direct belt loader with an inlet connection 239 which communicates with the reinjection outlet hose 238 (FIG. 5) to receive influent dusty fluid from the inlet hose 224 and separated recycled particulate material from the perforated tangential separator 214. The bulk material receiver 218 (FIG. 9) can comprise a belt conveyor, a material collection chamber, such as a bin or receiver, positioned below the gross cut rotary bulk separator 212 to receive the particulate laden stream from the gross cut rotary bulk separator 212 for transport to a collection and processing site.

Figure 6:
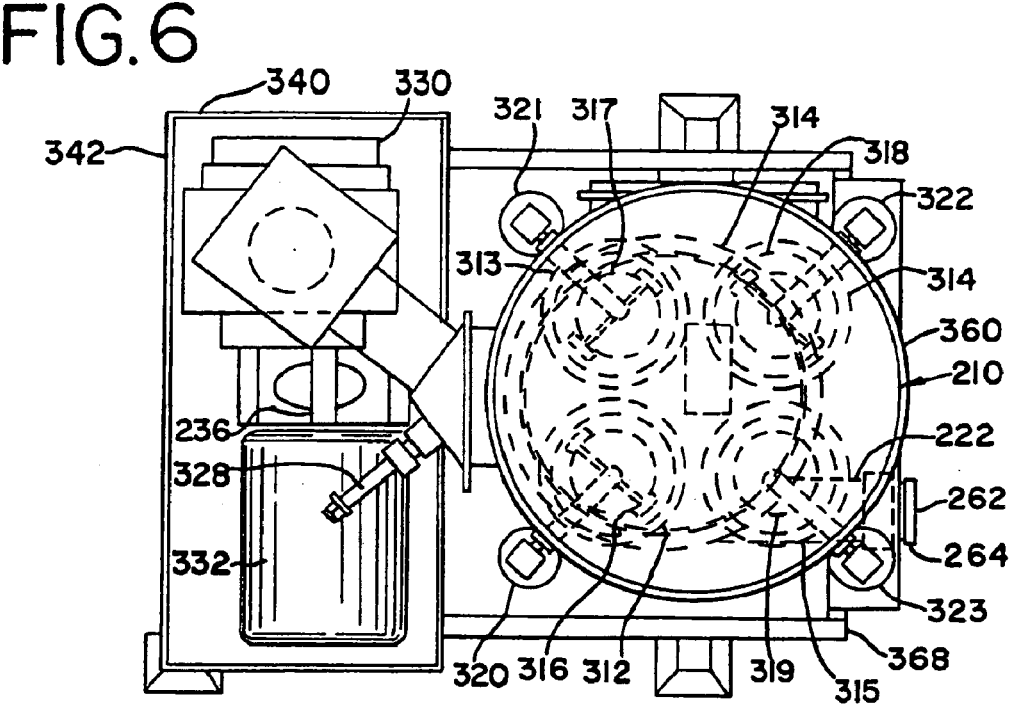
FIG. 6 is a top view of the vacuum loader with a perforated tangential separator.
Figure 9:
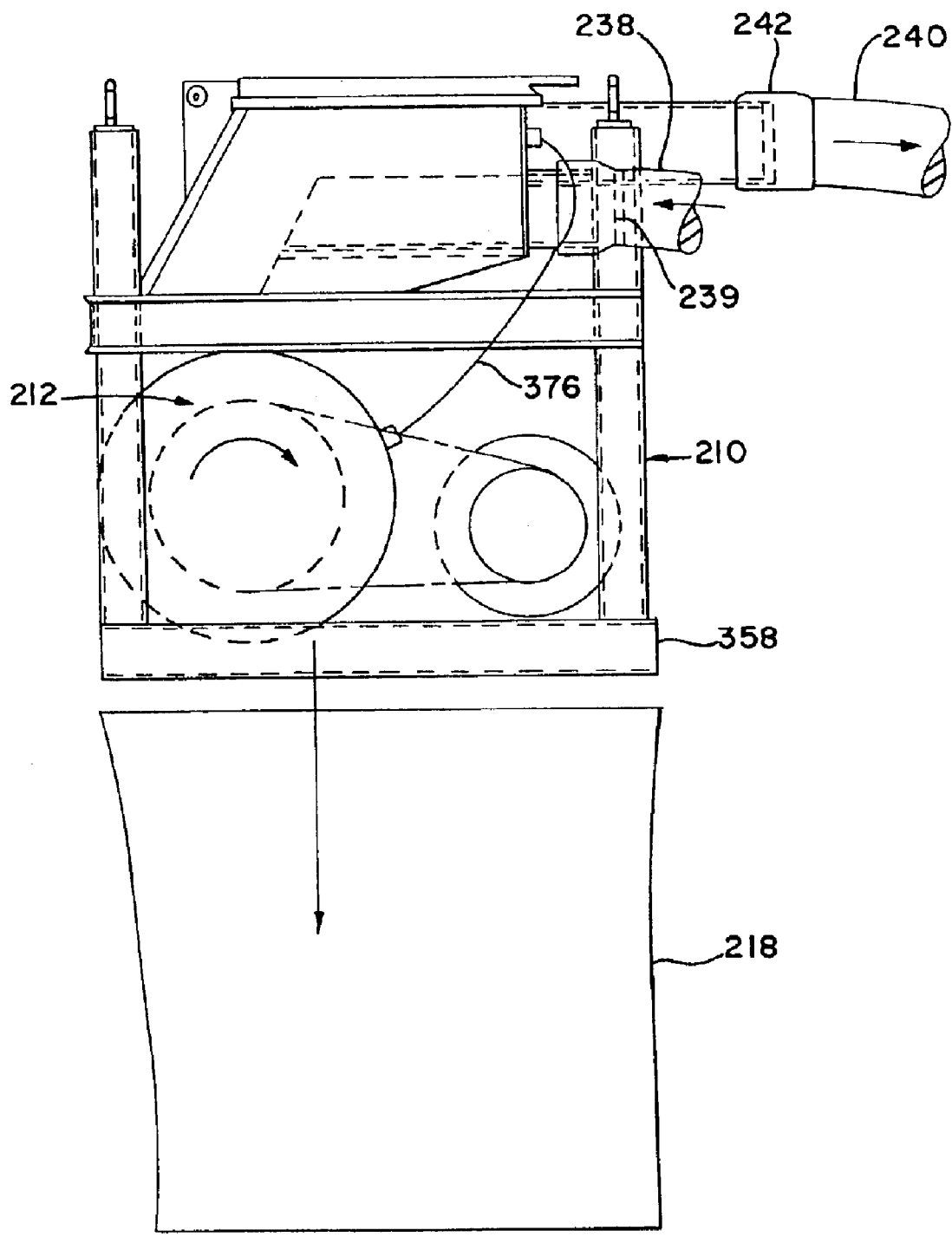
FIG. 9 is a side view of a first stage separation unit of the perforated tangential separator.

The partially dedusted air or other fluid is conveyed from the rotary bulk separator 212 (FIG. 9) of the first stage bulk separation unit to the perforated tangential separation unit 214 (FIGS. 4 and 5) via a bulk separation discharge hose 240. The perforated tangential entry cyclone separator 214 centrifugally separates most of the carryover dust from the bulk separated fluid for settlement and eventual flow through the air lock valves or airlock feeder 236 of the reinjection system positioned below the perforated tangential cyclone separator 214. The removed and centrifugally separated filtered particles fall by gravity to the reinjection air lock system below for recycling and reinjection into the bulk separator 212 (FIG. 9). The cleaner, centrifugally cycloned partially dedusted air is drawn (sucked) radially outwardly through the perforations 268 (FIGS. 5 and 7) of the cured upright cyclone wall plate 253 of the perforated plate tangential cyclone separator 214, where it flows upwardly to be filtered by the high efficiency cartridge filters 316–319 (FIGS. 4 and 6). The filters can filter the particulates down to under 1 micron, preferably at an efficiency of about 99.5% at about 0.33 microns. Collected dust on the surface of the filters 316–319 can be reverse air-pulse cleaned by variable pulse speed, air pulse injectors 320–323 for discharge through the air lock valves of the reinjection system into a vacuuming recycle line 238 (FIG. 5) for redepositing (reinjection) and recycling into the bulk separator 212 (FIG. 9) of the first stage bulk separation unit.

The vacuum loader 210 (FIG. 4) can incorporate a unique two stage separator system 214 and 222 which provides for highly effective separation of the vacuumed product (wet, dry, or fibrous, as well as liquids and slurries) thereby providing customers with versatile, effective, and substantially trouble-free vacuum cleaning and loading. The vacuum loader 210 can provide capabilities for long distance vacuuming of very light fibrous materials, such as fiberglass to lumps, chunks, soda ash, steel shot and talconite pellets. The vacuum loader 210 with reinjection system 230 and Rotaceptor rotary bulk separator 212 (FIG. 9) can comprise a unique direct conveyor belt loader for low overhead clearance applications.

Dusty material can be vacuumed from the material spill pile at the vacuuming work area via an inlet hose 224 (FIG. 5) and a reinjection tee 232, such as a five inch or six inch diameter reinjection tee where separated carryover dust from the rotary bulk separator 212 (FIG. 9) can be reinjected back into the vacuuming line. The vacuumed material can then flow through the hose 328 connecting the reinjection tee to inlet connection 239 of the rotary bulk separator 212 with direct belt loader. The rotary bulk separator 212 separates out and discharges the bulk of the vacuumed material to the bulk material receiver 218 comprising a belt conveyor, bin or receptacle (receiver). Any carryover dust can be air conveyed via the vacuum hose 240 connecting the rotary bulk separator's six inch outlet port 242 to a tangential inlet port 262 (FIG. 5). Any carryover dust will enter the perforated tangential separator 214 for separation and filtration by the cartridge filtration system 222 above. The separated and filtered dust can be deposited into and through the reinjection system's air-lock feeder 236 to the reinjection tee 232 below thereby transporting any carryover dust back to the rotary bulk separator 212 (FIG. 9) for deposit onto the bulk material receiver 218 comprising a belt conveyor, bin or receiver below. The filtered air can flow to the vacuum pump 330 (FIGS. 4 and 5) and then discharges through the muffler 340 with silencer base 342 and into the atmosphere via a vent pipe 354.

The reinjection system's air-lock feeder 236 (FIG. 5) and reinjection tee 232 provides for the return of any carryover dust back to the bulk discharge rotary bulk separator 212 (FIG. 9). It is important to stand away from the rotary bulk separator 212 and reinjection system's air lock feeder 236 (FIG. 5) when it is powered for running and not put hands or any parts into inlet or discharge openings of the rotaceptor's rotary air lock feeder 236, as well as to be careful near its shear blades.

The rotary bulk separator 212 (FIG. 9) with a direct belt loader serves to discharge the bulk of the vacuumed material onto the bulk material receiver 218 can comprise a belt conveyor, bin or receiver below. The rotary bulk separator 212 can have two forklift line channels 358 for discharge of the vacuumed material onto the bulk material receiver 218. The rotary bulk separator 212 can also have a prevent circuit 376 comprising an air pressure equalizing circuit to equalize the air pressure in each of the vane pockets prior to charging it with the vacuumed material.

The second stage separation unit 214 (FIG. 5) of the vacuum loader preferably incorporates a two stage separator system which provides for separation of the vacuumed product by: (a) the second stage tangential entry cyclone separator 214 and (b) multiple third stage cartridge filtration system 222 for final filtration of the carryover dust, such as to 99.97% of 0.33 microns.

The vacuum loader power unit can comprise two units which can be separated and transported separately by a fork lift truck. The vacuum loader powerhead assembly 360 (FIGS. 4 and 5) can comprise:

1. A cartridge filtration system 222.
2. A positive displacement vacuum pump 330.
3. 75 HP electric motor pump drive 332 (FIG. 4).
4. A silencer base muffler 340 with two forklift tine openings 362 and 364 for lifting the powerhead 360.
5. A control panel.
6. A pneumatic circuit sequence of operation function sequence.

The pneumatic circuit provides for the reverse air-pulse circuit for compressed air cleaning of the cartridge filters 316–319 (FIG. 9). The pulse cycle is controlled by a solid state pulse timer located in the control panel. The pulse duration is also adjustable can be 15 seconds with a pulse interval of six seconds.

The powerhead support base assembly 366 can comprise a:

1. Support base structure with two forklift tine openings 359 (FIG. 5) for a forklift truck lifting of the entire unit (powerhead 360 and support base assembly 366) or the support base assembly 366 only.
2. A perforated tangential separator 214.
3. A reinjection airlock feeder 236.
4. An air compressor.
5. A powerhead mounting guides and pins for guidance and maintaining of the powerhead 360 on the support base structure by a forklift truck.

The procedure for setup and assembly can be as follows:

1. Position the rotary bulk separator 212 (FIG. 9) over the bulk material receiver 128 comprising a belt conveyor, bin or receiver by inserting forklift truck tines into the two tine channel openings 358 located at the lowest portion of the rotary bulk separator's bail, and securely suspend it in place from the mine ceiling with the four eyes located on the bail; or hold the rotary bulk separator 212 in place over the mine belt 218 with a forklift truck.

2. Position the vacuum power package assembly comprising the powerhead 360 (FIG. 5) and support base 368 within view of the rotary bulk separator 212 (FIG. 9) and preferably not more than 50 feet away. Use a forklift truck, such as a 10,000 pound forklift truck, to move and position the assembly by lifting and moving by engaging the fork tines into the support base's lower fork tine channels located at floor elevation.

3. Twist lock into place the following 460V/3 Ph/60 Hz male twist lock safety plugs into 460V/3 Ph/60 Hz control panel female sockets located on the vacuum loader powerhead 160: (a) The rotary bulk separator 212 460V/3 Ph/60 Hz electric motor cord with twist lock connector; (b) The reinjection system's air-lock feeder 236, 460V/3 Ph/60 Hz, electric motor cord with twist-lock connector; and (c) The air compressor 374, 7½ HP 460 V/3 Ph/60 Hz electric motor cord with twist lock connector.

4. Connect the quick disconnect compressed air supply's wire wrapped pressure line from the 7½ HP air compressor 374 (FIG. 5) to the male connection fitting located on the powerhead at the pressure regulator.

5. Position the selector switches located on the powerhead control panel to the automatic positions as follows: (a) The rotary bulk separator selector switch to auto position; and (b) The reinjection system's air-lock feeder 236 (FIG. 5) to auto position. The selector switch's auto position will automatically start the respective rotary bulk separator 212 (FIG. 9) and the reinjection system's air-lock feeder 236 (FIG. 5) when the vacuum pump start push button is depressed.

6. The operator should now connect the vacuuming hoses 224, 238 and 240 (FIG. 5).

7. Position the vacuuming nozzle 226 (FIG. 5) at the material pile to be vacuumed. The nozzle 226 should not be placed into the material pile until after the vacuum loader pump 330 (FIG. 4) is running and all support equipment is running, including: (a) The rotary bulk separator 212, electric motor 460V/3 Ph/60 Hz. (b) The reinjection system's air-lock feeder 236, electric motor—460V/3 Ph/60 Hz; and (c) The air compressor 374 (FIG. 5) electric motor 460V/3 Ph/60 Hz.

8. Plug the plug of the electrical cord into an ample 460V/3 Ph/60 Hz electric power socket per local and national electrical safety codes.

9. Unlock and push the safety disconnect up to the on position. 460V/3 Ph/60 Hz power to the control circuit.

10. Pull out the main emergency stop mushroom button which will provide 11 5V/1 Ph/60 Hz power to the control circuit.

11. Push the vacuum pump's 330 START push button on the vacuum loader 210 control panel, or throw the RUIN switch on radio controlled remote starter, or push the START push button on the remote start/stop with cord and twist lock connector connected the 115V socket in control panel.

12. Pushing the vacuuming pump 330 (FIG. 5) START push button will initiate the following functions: (The vacuum pump 330 will not start at this time until the compressed air pressure is above the compressed air pressure switch set point.)

a. The 460 V/3 Ph-/60 Hz compressor 374 will start.
b. The 460V/3 Ph/60 Hz rotary bulk separator 212 (FIG. 9) drive will start. The ON/OFF auto, 3-position selector switch should be in the AUTO position for the rotary bulk separator 12.
c. The 460 V/3 Ph/60 Hz reinjection system's air-lock feeder 236 (FIG. 5) will start. The 2-position ON-AUTO selector switch should be in the AUTO position for automatic starting of the reinjection system's air-lock feeder 236.
d. Start the second stage cartridge filter reverse air-pulse cleaning circuit.

13. The operator can now commence to vacuum the product. The preferred vacuuming procedure includes: Vacuum load the vacuuming hose with material for vacuum readings of under 14 inch mercury on the gauge. This will assure that the vacuum pump 330's vacuum breaker does not open and bypass air. Bypassing air at the vacuum pump 330 will greatly affect vacuuming capacity. If the pump 330 vacuum breaker audibily pops, back off on the vacuuming rate by adjusting the air bypass sleeve located on the vacuuming nozzle 226. increasing orifice hole openings will bypass more air at the nozzle 226 thus reducing material pick up rate from the pile. Decreasing orifice hole openings will decrease air bypass at the vacuuming nozzle 26 and increase material pickup rate from the pile.

It is recommended to use a vacuuming nozzle 226 when vacuuming material. Not using a nozzle 226 can overload the vacuuming hose 224 thereby causing the vacuum relief valve to pop, which will result in possible plugging of material in the hose. Air or fluid flow is necessary to convey the product.

When material starts to move extremely slow at the vacuuming nozzle 226 and stoppages occur at the nozzle 226 pickup, pull the nozzle 226 out of the material to allow the material in the vacuuming hose 224 to clear out.

If the flow of material into vacuuming nozzle 226 decreases substantially for no apparent reason, there may be a lump or object (wire, etc.) wedged in the nozzle 226 or hose 224. The lump normally can be detected visually through the transparent hose wall or by lifting the hose along the run to determine where the higher weight is located. To unplug a section of hose, unclamp the section and turn the hose end to end for a reverse air flow.

If a high differential on the cartridge filter is observed over 20 inch water, then run the vacuum loader 210 and its components and do not vacuum product. This will allow the cartridge filters 316–319 (FIG. 6) to pulse-down and the perforated tangential separator 214 below it to clear any accumulation of material in the tangential separator 14 to the rotary bulk separator 212 (FIG. 9) for discharge.

If the cartridge filter differential exceeds a preset limit, such as 30 inch water, the vacuum loader 210 will automatically shut down. At this occurence, manually push the start vacuuming push button to initiate another automatic pulse-down of the cartridge filters 316–319 (FIG. 6) with no air-flow of the vacuum pump 330.

If the cartridge filter differential again climbs to the limit, such as 30 inch water differential, the perforated tangential separator 214 needs to be cleared of excess material and any debris. Access the perforated tangential separator 214 through the two filter housing access doors and move the accumulated material to the reinjection feeder's inlet port by means of a push rod. Also remove any foreign debris. The vacuuming system must not be operating during this period and the main disconnect must be down in the Off position.

The operator will continue to vacuum material until finished, at which time he will push STOP VACUUMING bottom which will immediately stop the: (a) vacuum pump 330; (b) rotary bulk separator 12 inch, reinjection system's feeder; (c) compressor 374; and (d) reverse air-pulse cartridge filter cleaning system.

For safety precautions, prior to transporting the rotary bulk separator 212 to a new location by a facility 5500 pound forklift truck, the operator should:

a. Throw the main (460V/3 Ph/60 Hz) disconnect located on the control panel down to the OFF position, which will cut off all electrical power in the control panel except for the (460V/3 Ph/60 Hz) power feed to the main disconnect.

b. Push the main (115V/1 Ph/60 Hz) power button on the control panel of the position.

c. Disconnect the power cord from the power supply disconnect.

d. Disconnect the rotary valve's twist-lock cord connector from the control panel and securely wind it onto the cord retainer brackets provided on the interceptor support frame.

In order to move, dismantle or disassemble the vacuum loader 210 (FIGS. 4 and 5), the powerhead 360 assembly can be separated from the support base assembly by a forklift truck. Thereafter, disconnect the quick connect compressed air line form the pressure regulator connector located on the powerhead 360. Disconnect the three (3) twist-lock (460V/3 Ph/60 Hz) cord connectors from the control panel located at the rear of the powerhead 360 which are serving the (460V/3 Ph/60 Hz) air compressor 374 and the (460V/3 Ph/60 Hz) reinjection system air-lock feeder 36 which are both mounted on the lower support base assembly. Also, disconnect the twist-lock cord connector from the control panel which is serving the (460V/3 Ph/60 Hz) rotary bulk separator 212 drive. If an overhead clearance problem exists, the powerhead 360 can be removed form the support base assembly below for transport by a forklift truck to the new location. The powerhead 360 can be lifted for transport by a forklift truck by fully inserting the forklift tines into the two fork tine openings 362 and 364 (FIG. 5). The lower section support base assembly can be then lifted by the forklift truck and transported to the new location. The support base assembly 366 can be lifted at the two fork tine openings 358. The rotary bulk separator 212 (FIG. 9) can be lifted via its two fork tine openings 358 by the forklift truck and transported to its new location.

The perforated tangential separator 214 (FIGS. 4 and 5) can be short with a height of about twice the diameter of the inlet hose 240, i.e. the ratio of the height of the perforated tangential separator 214 to the diameter of the inlet hose 240 or cyclone inlet 262 can be 2:1, e.g. a 12 inch high perforated tangential separator is used with a 6 inch inlet hose. In contrast, conventional tangential cyclones with cones are relatively tall with a height of about ten time (10 fold) the diameter of the inlet hose. The vacuum loader 210 can have a height ranging from 6.5 feet to 7.5 feet with a 2, 4 or 6 inch diameter inlet hose 240, and a perforated tangential separator 214 height ranging from 4 inches to 12 inches.

Among the many advantages of the preceding vacuum loaders and industrial dust collectors are:

1. Superior vacuuming and removal of particulate matter, debris and waste.
2. Better solids-gas separation.
3. Enhanced air purification.
4. Excellent dedusting.
5. Greater efficiency of operation.
6. More economical to manufacture and operate.
7. Enhanced air purification.
8. Greater decreased operator exposure to dust.
9. Good load-carrying collection capacity.
10. Flexibility and better adaptability for moveable, towable, portable and stationary operations.
11. Superb performance.
12. Easy to use.
13. Dependable.
14. Quieter operation.
15. Lateral and/or upward flow of air into filters.
16. Easy to install, remove and repair.
17. Less maintenance.
18. Economical.
19. Efficient.
20. Effective.

Although embodiments of the invention have been shown and described, it is to be understood that various modifications and substitutions, as well as rearrangements of parts, components, equipment, apparatus and process steps, can be made by those skilled in the art without departing from the novel spirit and scope of this invention.

What is claimed is:

1. A vacuum loader for removing particulate material, comprising: an industrial vacuum cleaner having a frame assembly for receiving a hopper comprising a bin, said frame assembly providing a support platform; a primary inlet conduit; a vacuum pump mounted on the support platform and having a blower line for drawing influent dusty air laden with particulates of dust through said primary inlet conduit; said primary inlet conduit providing a flexible vacuuming hose for removing and collecting particulates of dust from an area surrounding the industrial vacuum cleaner; a sound attenuating device connected to said vacuum pump for attenuating and decreasing noise and vibrations from said vacuum pump; a solids-gas separation compartment secured to said frame assembly for making a gross cut separation of larger particulates of dust; said solids-gas separation compartment having an open bottom positioned above and communicating with said bin to discharge larger particulates of dust into said bin, said solids-gas separation compartment having an inlet port connected to said primary inlet conduit and outlet ports for discharging a partially dedusted gas stream; at least one filtering compartment communicating with said outlet ports of said solids-gas separation compartment and having filters for filtering and removing most smaller particulates of dust comprising fines remaining in the partially dedusted gas stream, said filtering compartment having outlets for discharging the filtered air to said blower line of the vacuum pump for discharging the filtered air into the surrounding area, said filtering compartment having an open bottom positioned above the bin for discharging filtered particulates of dust into the bin, said solids-gas separation compartment comprising a perforated plate formanious tangential separator for partially dedusting and separating a substantial amount of particulates from said influent dusty air, said perforated plate foraminous tangential separator having a foraminous upright curved cyclone wall plate for minimizing turbulence and reintrainment of particulates of dust and for minimizing clogging and substantially enhancing separation of said particulates of dust, said foraminous upright curved cyclone wall plate being positioned in proximity to said primary inlet conduit comprising said flexible vacuuming hose at an inlet end of said industrial vacuum cleaner, said foraminous upright curved cyclone wall plate being positioned above said bin said foraminous upright curved cyclone wall plate being spaced laterally away from and in offset relationship to said filters in said filtering compartment, said perforated plate foraminous tangential separator defining an inlet for receiving said influent dusty air containing said particulates of dust, and said foraminous upright curved wall plate defining perforations providing outlets for discharge of said partially dedusted gas stream to said filtering compartment.

2. A vacuum loader in accordance with claim 1 wherein:

said perforations are arranged in a pattern to substantially prevent reentrainment of said particulates of dust;

said perforations are smaller than a substantially amount of said particulates of dust to prevent passage of a substantial amount of said particulates of dust therethrough; and a secondary inlet conduit positioned substantially parallel and in offset relationship to said primary inlet conduit, said secondary inlet conduit being connected to and communicating with said perforated plate foraminous tangential separator and cooperating with said primary inlet conduit to provide dual inlet conduits for creating a turbulent action of the influent dusty air in said perforated plate of said foraminous tangential separator.

3. A vacuum loader in accordance with claim 1 wherein:

said perforations are spaced from said inlet from about 30 to about 330 degrees; and said gas stream comprises air.

4. A vacuum loader in accordance with claim 1 wherein:

said perforations are spaced from said inlet from about 90 to about 270 degrees; and said perforations comprise upright openings.

5. A vacuum loader in accordance with claim 1 wherein:

said perforations are spaced from said inlet from about 60 to about 300 degrees; and said perforations have a maximum diameter ranging from 1/16 to 1/4 inch.

6. A vacuum loader for removing particulate material, comprising:

an industrial vacuum cleaner having a frame assembly for receiving a hopper comprising a bin, said frame assembly providing a support platform; a primary inlet conduit; a vacuum pump mounted on the support platform and having a blower line for drawing influent fluid laden with particulate material of dust through said primary inlet conduit; said primary inlet conduit providing a flexible vacuum hose for removing and collecting particulate material from an area surrounding the industrial vacuum cleaner; a sound attenuating device connected to said vacuum pump for attenuating and decreasing noise and vibrations from said vacuum pump: a solids-gas separation compartment secured to said frame assembly for making a gross cut separation of larger particulate material of dust; said solids-gas separation compartment having an open bottom positioned above and communicating with said bin to discharge larger particulate material of dust into said bin, said solids-gas separation compartment having an inlet port connected to said primary inlet conduit and outlet ports for discharging a partially separated fluid stream containing a smaller amount of particulate material by weight than said influent fluid; at least one filtering compartment communicating with said outlet ports of said solids-gas separation compartment and having filters for filtering and removing most smaller particulate material comprising fines remaining in the partially separated fluid stream; said filtering compartment having outlets for discharging the filtered fluid to said blower line of the vacuum pump for discharging the filtered fluid into the surrounding area; said filtering compartment having an open bottom positioned above the bin for discharging filtered particulate material into the bin; said solids-gas separation compartment comprising a foraminous tangential separator for partially separating a substantial amount of particulate material from said influent fluid, said foraminous tangential separator means comprising;

an inlet for ingress of influent fluid containing particulate material;

an outlet comprising a lower particulate outlet for egress of separated particulate material;

a curved cyclone wall plate with apertures providing fluid outlets for egress of partially dedusted fluid;

said foraminous curved cyclone wall plate being positioned in proximity to said primary inlet conduit comprising said flexible vacuum hose at an inlet end of said industrial vacuum cleaner;

said foraminous curved cyclone wall plate being positioned above said bin; and said foraminous curved cyclone wall plate being spaced laterally away from and in offset relationship to said filters in said filtering compartment.

7. A vacuum loader for removing particulate material, comprising:

a frame assembly for receiving a hopper comprising a bin; said frame assembly providing a support platform;

a primary inlet conduit;

a vacuum pump mounted on the support platform and having a line for drawing influent dusty fluid laden with particulates of dust through said primary inlet conduit;

said primary inlet conduit providing a flexible vacuum hose for removing, and collecting particulates of dust from an area surrounding the vacuum loader;

a sound attenuating device connected to said vacuum pump for attenuating and decreasing noise and vibrations from said vacuum pump;

a solids-gas separation compartment secured to said frame assembly for making a gross cut separation of larger particulates of dust, said solids-gas separation compartment having an inlet port connected to said primary inlet conduit and outlet ports for discharging a partially dedusted fluid stream;

at least one filtering compartment communicating with said outlet ports of said solids-gas separation compartment and having filters for filtering and removing most smaller particulates of dust comprising fines remaining in the partially dedusted fluid stream, said filtering compartment having, outlets for discharging the filtered fluid to said line communicating with said vacuum pump for discharging the filtered fluid into the surrounding area, said filtering compartment having an open bottom positioned above the bin for discharging filtered particulates of dust into the bin, said solids-gas separation compartment comprising a perforated tangential entry cyclone separator for partially dedusting and separating said fluid laden with particulate material, said perforated tangential entry cyclone separator comprising a housing having an upright curved wall plate;

an inlet comprising a tangential intake conduit extending linearly and tangentially outwardly from said housing, said inlet being connected to said flexible vacuum hose comprising said primary inlet conduit;

a lower particulate outlet positioned above said bin comprising a downwardly facing outlet port for discharging separated particulate material by gravity flow substantially downwardly from said separator into said bin;

said upright curved wall plate comprising outlet ports extending radially for exiting partially dedusted fluid substantially radially from said separator; and said curved wall plate being positioned in proximity to said primary inlet conduit comprising said flexible vacuum hose at an inlet end of said vacuum loader, said curved wall plate being, positioned above said bin, and said curved wall plate being spaced laterally away from and in offset relationship to said filters in said filtering compartment.

8. A vacuum loader in accordance with claim 7 wherein:

said fluid is selected from the group consisting of air, gas, liquid, and combinations of the preceding;

said outlet ports are selected from the group consisting of perforations, apertures, holes, slits, openings, and passageways; and said outlet ports occupy from about 3% to about 95% of said curved wall plate.

9. A vacuum loader in accordance with claim 7 wherein:

said outlet ports are selected from the group consisting of round holes, square holes, rectangular holes, oval holes, elliptical holes, and polygonal holes; and said outlet ports occupy from about 10% to about 65% of said curved wall plate.

10. A vacuum loader in accordance with claim 7 wherein:

said outlet ports are arranged in rows selected from the group consisting of curved rows, parallel rows, staggered rows, offset rows, and aligned rows; and said rows extend from about 1 to about 360 degrees.

11. A vacuum loader in accordance with claim 10 wherein:

said rows extend from about 60 to about 300 degrees; and said outlets ports range from about 10 to about 135 outlet ports per square inch of said cured wall plate.

12. A vacuum loader in accordance with claim 7 with multiple filtering compartments.

* * * * *